(12) United States Patent
Reiter et al.

(10) Patent No.: US 7,693,029 B2
(45) Date of Patent: Apr. 6, 2010

(54) RECORDABLE OPTICAL DISC

(75) Inventors: Gottfried Reiter, Adnet (AT); Josef Schuller, Salzburg (AT)

(73) Assignee: SONY DADC Austria AG, Anif (AT)

( * ) Notice: Subject to any disclaimer, the term of this patent is extended or adjusted under 35 U.S.C. 154(b) by 884 days.

(21) Appl. No.: 11/510,693

(22) Filed: Aug. 28, 2006

(65) Prior Publication Data

US 2007/0058519 A1    Mar. 15, 2007

(30) Foreign Application Priority Data

Sep. 9, 2005    (EP) .................................. 05019687

(51) Int. Cl.
*G11B 7/24* (2006.01)
*G11B 7/00* (2006.01)

(52) U.S. Cl. ................ 369/275.1; 369/47.28; 369/53.2; 369/53.24

(58) Field of Classification Search ................ None
See application file for complete search history.

(56) References Cited

U.S. PATENT DOCUMENTS 6,310,854 B1    10/2001    Sato et al.
7,057,993 B2 *   6/2006    Barnard et al. ........... 369/53.21
2001/0030932 A1  10/2001   Spruit et al.
2005/0047321 A1   3/2005   Maruyama et al.
2008/0049933 A1 *  2/2008   Kuroda ....................... 380/201

FOREIGN PATENT DOCUMENTS

EP    1 107 251 A1    6/2001

OTHER PUBLICATIONS

"More on DVD Recordable", BurnWorld.com-DVD Recordable, XP-002381835, retrieved on May 18, 2006, pp. 1-3, URL: http://www.burnworld.com/dvd/primer/dvdrecordable.htm.
U.S. Appl. No. 11/514,920, filed Sep. 5, 2006, Reiter.

* cited by examiner

*Primary Examiner*—Muhammad N. Edun
(74) *Attorney, Agent, or Firm*—Oblon, Spivak, McClelland, Maier & Neustadt, L.L.P.

(57) ABSTRACT

A recordable optical disc (1, 1', 1", 100) comprises at least one user data area (12) for storing user data, and at least one controlling data area (6, 8, 10, 11) for storing controlling data necessary for accessing stored user data and/or for recording user data into a user data area (12), wherein at least a part of the physical structure of the optical disc corresponding to at least a part of at least one controlling data area (6, 8, 10, 11) and/or to at least a part of at least one user data area (12) has a modified physical structure (118, 120, 122, 123) which is arranged such that a standard optical disc recorder cannot record user data into at least a part of at least one user data area and/or controlling data area (6, 8, 10, 11).

27 Claims, 20 Drawing Sheets

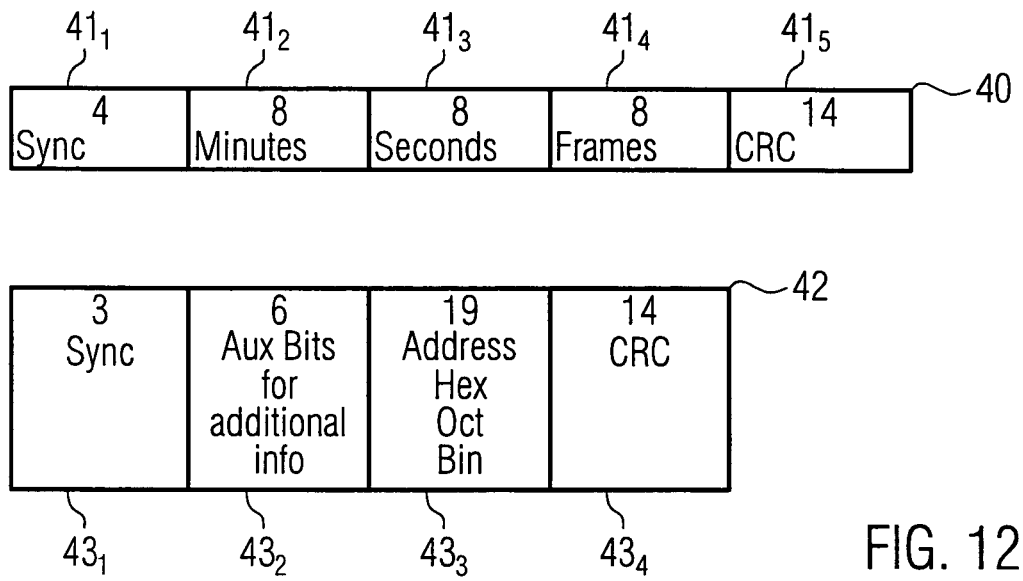
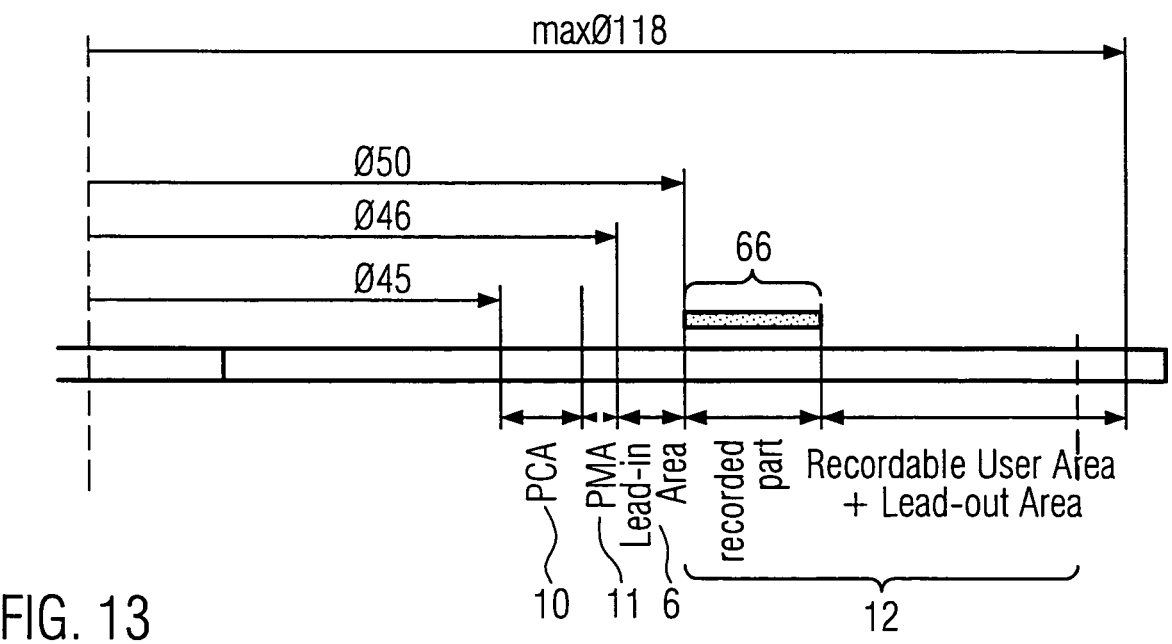
FIG. 12
FIG. 13

RECORDABLE OPTICAL DISC

TECHNICAL FIELD

The invention relates to a recordable optical disc as well as a master disc and an optical disc recorder.

BACKGROUND

Standard recordable optical discs like CD-Rs, CD-RWs, DVD+Rs or DVD-Rs can be recorded with digital content (e.g. audio content, video content or software content) using any standard CD recorder/DVD recorder. Since illegal copying of digital content and counterfeiting of original recordable optical discs has become a serious problem in the last years, new, effective ways of preventing counterfeiting and illegal copying of digital content are needed.

SUMMARY OF THE INVENTION

It is an objective of the present invention to provide new ways of preventing counterfeiting and illegal copying of digital content.

In order to solve this objective, the present invention provides a recordable optical disc according to claim 1. Further, the present invention provides a master disc according to claim 26. In addition, an optical disc recorder according to claim 27 is provided. Preferred embodiments of the present invention are defined by dependent claims.

According to the present invention, recordable discs are provided which can only be recorded with digital content using special CD recorders/DVD recorders not available for end customers, however, allow reading of the recorded digital content using any standard CD player/DVD player.

The recordable optical disc according to a first aspect of the present invention comprises at least one user data area for storing user data, and at least one controlling data area for storing controlling data necessary for accessing stored user data and/or for recording user data into the user data areas, wherein at least a part of the physical structure of the optical disc corresponding to at least a part of at least one controlling data area and/or to at least a part of at least one user data area "is replaced" by a modified physical structure which is arranged such that a standard optical disc recorder cannot record user data into at least a part of at least one user data area and/or controlling data area.

According to the present invention, the modified physical structure "confuses" the optical disc recorder when trying to record data into a user data area/controlling data area. In order to achieve this, the modified physical structure has to be located at a position on the recordable optical disc which will be accessed by the reading laser beam and/or writing laser beam of the optical disc recorder before or during the recording process. The modified physical structure has to be designed such that the modified physical structure itself and/or modified optical/electrical signals which occur during the recording process and which result from the modified physical structure (for example the reading laser beam reflected at the modified physical structure or electrical signals into which the reflected reading laser beam will be converted) are not in conformity with the respective specification for the optical disc. The modified physical structure may for example effect that the standard optical disc recorder has laser beam focusing problems and/or can not read address information/timecode information and/or can not set the right disc rotation speed. Another effect may be that the laser beam of the standard optical disc recorder looses its track. The result of any of these or other similar effects will be that the standard optical disc recorder will not be capable of recording user data into the user data areas/controlling data areas.

In the scope of the present invention, the term "standard optical disc recorder" and "standard optical disc reader" means an optical disc recorder/reader which interprets/processes controlling data or content data prestored on the recordable optical disc (in the following also only referred to as "compact disc" or "disc" or "DVD") in accordance with a predetermined optical disc standard. Optical disc standards within the scope of the present invention are in particular the standards described within:

Red Book or IEC-908 (specification for CD audio)
Yellow Book or ECMA-130 (Specification for CD-ROM)
Orange Book Part II and Part III
Blue Book (Specification for Multisession CD)
DVD-ROM or ECMA-267
DVD+R 4.7 GB ECMA-349
DVD-R 4.7 GB ECMA-359
DVD+R 4.7 GB ECMA-337
DVD-RW 4.7 GB ECMA-338
DVD+R DL 8.5 GB ECMA-364.

However, the present invention is not restricted to these standards; the present invention is also applicable to other existing standards or future standards. The present invention is applicable to any kind of optical discs like CD-Rs, CD-RWs, DVD+Rs or DVD-Rs or recordable optical discs of the MiniDisc format, Blu-ray Disc format, HD-DVD format, magneto-optical disc format, UMD format, or the like. Thus, the term "recordable optical disc" herein includes write once and write many (rewritable) optical discs.

The present invention further provides a master disc for storing a master image, the master disc being suitable to transfer the master image onto a plurality of recordable optical discs, wherein the master image represents at least one user data area for storing user data, and at least one controlling data area for storing controlling data necessary for accessing stored user data and/or for recording user data into user data areas of a recordable optical discs, wherein at least a part of the master image which corresponds to at least a part of at least one controlling data area and/or to at least a part of at least one user data area represents a modified physical structure of the recordable optical disc which is designed such that a standard optical disc recorder cannot record user data into at least a part of at least one user data area and/or controlling data area.

The present invention also provides an optical disc recorder for recording data onto a recordable optical disc which comprises at least one user data area for storing user data, and at least one controlling data area for storing controlling data necessary for accessing stored user data and/or for recording user data into the user data areas of a recordable optical disc, wherein at least a part of a physical structure of the optical disc which corresponds to at least a part of at least one controlling data area and/or to at least a part of at least one user data area is replaced by a modified physical structure which is designed such that a standard optical disc recorder cannot record user data into at least a part of at least one user data area and/or controlling data area, wherein the optical disc recorder possesses information about the modified physical structure and/or is built or modified to cope with the modified physical structure, thereby enabling the optical disc recorder to record user data into said part of said at least one user data area.

The information about the modified physical structure may for example be data prestored (recorded or mastered) on the recordable optical disc. Alternatively or additionally, the information about the modified physical structure may be part of the recording software or firmware used by the optical disc recorder to perform the recording processes.

According to a second aspect of the present invention, the recordable optical disc comprises at least one user data area for storing user data, and at least one controlling data area for storing controlling data necessary for accessing stored user data and/or for recording user data into the user data areas, wherein at least a part of at least one controlling data area comprises prestored controlling data which is interpretable by a standard optical disc recorder such that user data cannot be recorded by the standard optical disc recorder into at least a part of at least one user data area, and/or which is interpretable by a standard optical disc recorder such that controlling data cannot be recorded by the standard optical disc recorder into at least a part of at least one controlling data area, and/or, where a standard optical disc recorder is capable of recording data into at least one user data area of the said optical disc, the prestored controlling data is interpretable by a standard optical disc reader such that user data of at least a part of at least one user data area cannot be read by a standard optical disc reader.

Alternatively or additionally, the recordable optical disc according to the present invention comprises at least one user data area for storing user data, and at least one controlling data area for storing controlling data necessary for accessing stored user data and/or for recording user data into the user data areas, wherein at least a part of at least one user data area comprises prestored user data which is interpretable by a standard optical disc recorder such that user data cannot be recorded by the standard optical disc recorder into at least a part of at least one user data area, and/or which is interpretable by a standard optical disc recorder such that controlling data cannot be recorded by the standard optical disc recorder into at least a part of at least one controlling data area, and/or, where a standard optical disc recorder is capable of recording data into at least one user data area of the said optical disc, the prestored controlling data is interpretable by a standard optical disc reader such that user data of at least a part of at least one user data area cannot be read by a standard optical disc reader.

According to the present invention, the prestored controlling data/prestored user data "confuses" the optical disc recorder when trying to record data into a user data area. In order to achieve this, the prestored controlling data/prestored user data comprises data which is accessed or which the optical disc recorder attempts to access before or during the recording process. In the scope of the present invention, the term "prestored controlling data" also includes the case of non existence of contolling data in the sense that the non existent controlling data is "misleading prestored" controlling data.

As already indicated above, the "confusion" of the standard optical disc recorder can be effected by prestored controlling data as well as by prestored user data or a combination of both. In the following description, for sake of simplicity, only the first alternative (prestored controlling data) will be discussed. All embodiments (concerning the recordable optical disc, data signal, master disc, and optical disc recorder according to the present invention) discussed above or below in conjunction with prestored controlling data may also be realized in a similar manner using prestored user data or combined with prestored user data in the sense of the last four paragraphs.

Since the behaviour of different optical disc recorders generally vary from each other (e. g. the operation of standard optical disc recorders may be inconsistent between different manufacturers), some standard optical disc recorders may be capable of recording data into a user data area even if controlling data intended to confuse the optical disc recorder is prestored on the optical disc. Therefore, the prestored controlling data should also have an effect that undesired recorded data is not readable by a standard optical disc reader. This option is in particular important for the case where two different controlling data areas are provided, each of them comprising individual prestored controlling data which serves for preventing data to be recorded onto the optical disc, respectively. Each of these controlling data areas can be regarded as an own "copy preventing trap" (according to the present invention, an arbitrary number of "copy preventing traps" can be provided on the optical disc). If the recording process of a standard optical disc recorder is not affected (i.e. prevented) by the first trap (although the controlling data of the first trap is interpreted), and if the standard optical disc recorder further does not "reach" the second trap (the controlling data of the first trap is not interpreted), it is important that the prestored controlling data of the first trap has an effect that undesired recorded data is not readable by the standard optical disc reader, since otherwise the copy protection mechanism may not work as intended.

Example: If the pregap of an optical disc is recorded (prestored controlling data), a standard optical disc recorder may be capable of recording data into the user data area (although other standard optical disc recorders are not since they will be confused by the prestored controlling data). The reason may be due to differences in the strategies for writing data. For example, some recorders may not check for recorded data if the area is unrecorded according to the information in the PMA and/or lead-in area(s) but just write into the 'unrecorded' area (these recorders are not confused by the prestored controlling data). Other recorders may verify before writing if the area is unrecorded and/or abort writing when they detect recorded data (these recorders are confused). However, even if data is recorded into the user data area by a recorder which is not confused by the prestored controlling data, such recorded data would be of no use since the standard optical disc recorder which will not check for recorded data will overwrite the existing prepap. In this case, the pregap will not be readable by a standard optical disc reader. To give an example: If there is information (controlling data) in the PMA area indicating that there is one track which occupies the area from 00:02:00 to 04:10:00 but actually this area is not recorded, a standard optical disc recorder may be capable of recording data after 04:10:00 into the user data area (while other standard optical disc recorders are not) if this recorder does not check for existence of the recorded track according to the information in the PMA but just write into the 'unrecorded' user data area (area after 04:10:00). Other recorders which verify the end of the last track before writing of the new track will not write data into the 'unrecorded' user data area. If data is recorded into the 'unrecorded' user data area, such data is of no use since an optical disc reader cannot access this data (there is an unrecorded "gap" before the data).

An advantage of the present invention is the following: "Blank" recordable optical discs according to the present invention can be used (recorded) only with dedicated recorders (recorders according to the present invention). Thus, "normal" end customers are not capable of recording data into these optical discs. A dispensation for paying blank type levies may therefore be provided by copyright organizations for "blank" recordable optical discs according to the present invention to special customers using a recorder according to the present invention, which make a contract with copyright organizations with the objective not to record copyright protective data onto the recordable/rewriteable compact disc according to the present invention.

In order to indicate that the discs according to the present invention are special copy protected discs, the discs may be provided with identification elements like pitlogos, holograms, high resolution printing, security printing, watermarks, or the like.

BRIEF DESCRIPTION OF THE DRAWINGS

All different aspects of the present invention as set out above and further elucidated below might be combined in any way. The accompanying drawings, which are incorporated in and constitute a part of the specification, illustrate an exemplary embodiment of the invention and, together with a general description of the invention given above, and the detained description of the embodiments given below, serve to explain the principles of the invention, wherein:

FIG. 12 shows an eleventh embodiment of the recordable optical disc according to the present invention;

FIG. 13 shows a twelfth embodiment of the recordable optical disc according to the present invention;

BEST MODE FOR CARRYING OUT THE INVENTION

Figure 1:
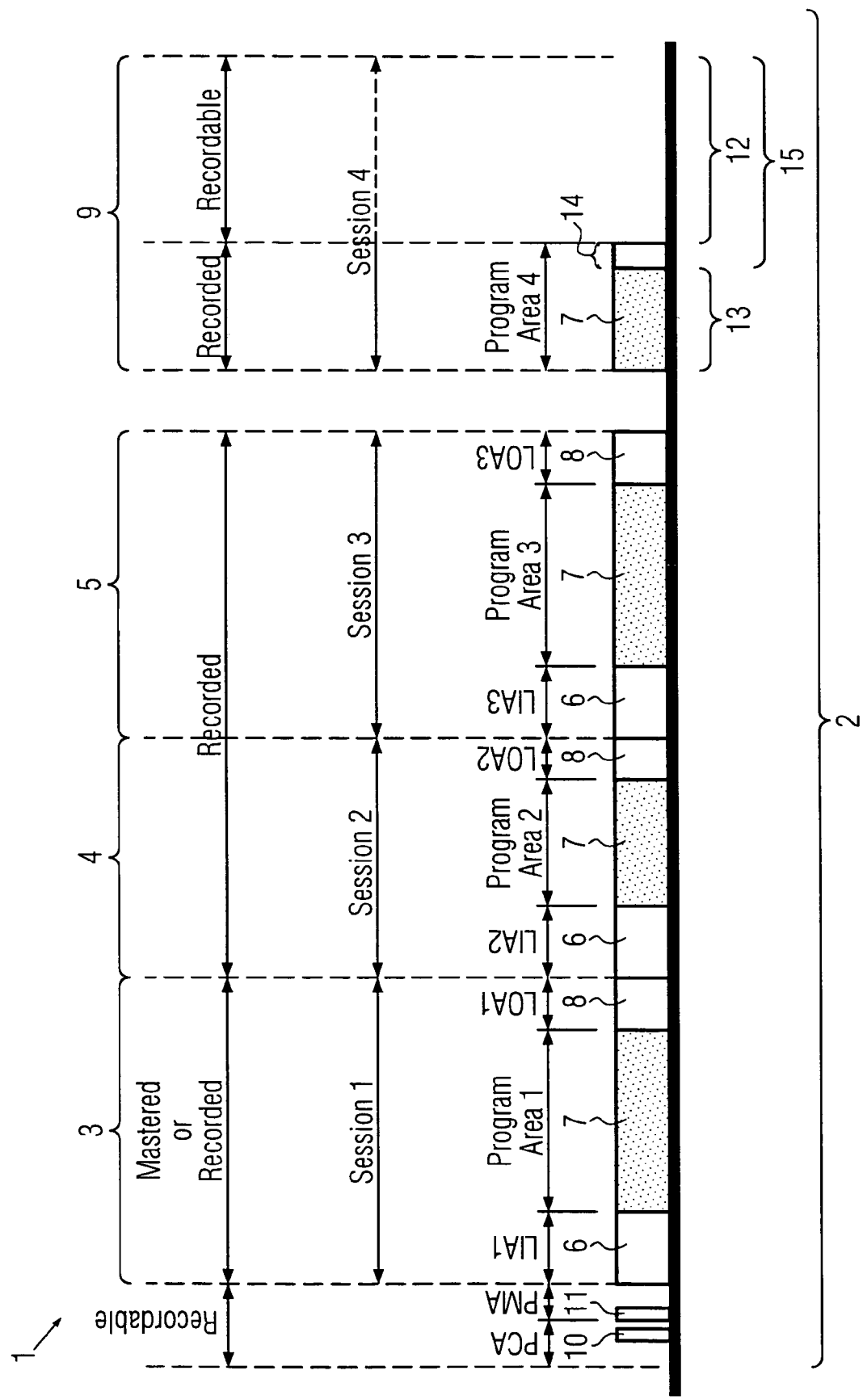
FIG. 1 shows a data layout of a conventional multisession compact disc.

In the Figures identical or corresponding parts are identified by the same reference numerals.

The recordable optical disc according to a first aspect of the present invention comprises at least one user data area for storing user data, and at least one controlling data area for storing controlling data necessary for accessing stored user data and/or for recording user data into the user data areas. At least a part of the physical structure of the optical disc corresponding to at least a part of at least one controlling data area and/or to at least a part of at least one user data area is replaced by a modified physical structure which is designed such that a standard optical disc recorder cannot record user data into at least a part of at least one user data area/controlling data area.

First, for a better understanding of the present invention, the general organization of data of a conventional multisession compact disc will be explained while making reference to FIG. 1:

A recordable compact disc 1 comprises an information area 2 in which user data (content data) as well as controlling data necessary for writing/reading the user data is stored. In this example, the information area 2 comprises a first session 3, a second session 4 and a third session 5. Each of the sessions 3, 4 and 5 is finalized, i.e. comprises a lead-in area LIA 6, a track data area 7 which may for example comprise one or more tracks (data tracks and/or audio tracks), respectively, and a lead-out area LOA 8. In this example, the first session 3 has been generated by a mastering process, whereas the second session 4 and the third session 5 have been generated by a recording process. The information area 2 further includes a non-finalized fourth session 9, which may comprise one or more tracks (for example data tracks or audio tracks). The information area 2 further comprises a PCA (Power Calibration Area) area 10 serving for laser beam power calibration purposes and a PMA (Program Memory Area) area 11 which contains information about recording/mastering processes of user data already performed.

Assuming that a recordable compact disc is a recordable optical disc in the sense of the present invention, the area referenced with reference numeral 12 is to be interpreted as user data area into which user data can still be recorded, wherein the program areas 7 are already filled with prestored user data, and wherein the rest of the data areas (lead-in area LIA 6, lead-out area LOA 8, PCA 10, PMA 11) are to be interpreted as controlling data areas. However, as will become apparent later, also parts of the program areas 7/user data area 12 may be interpreted as controlling data areas (for example areas from which physical location information can be derived).

Figure 21:
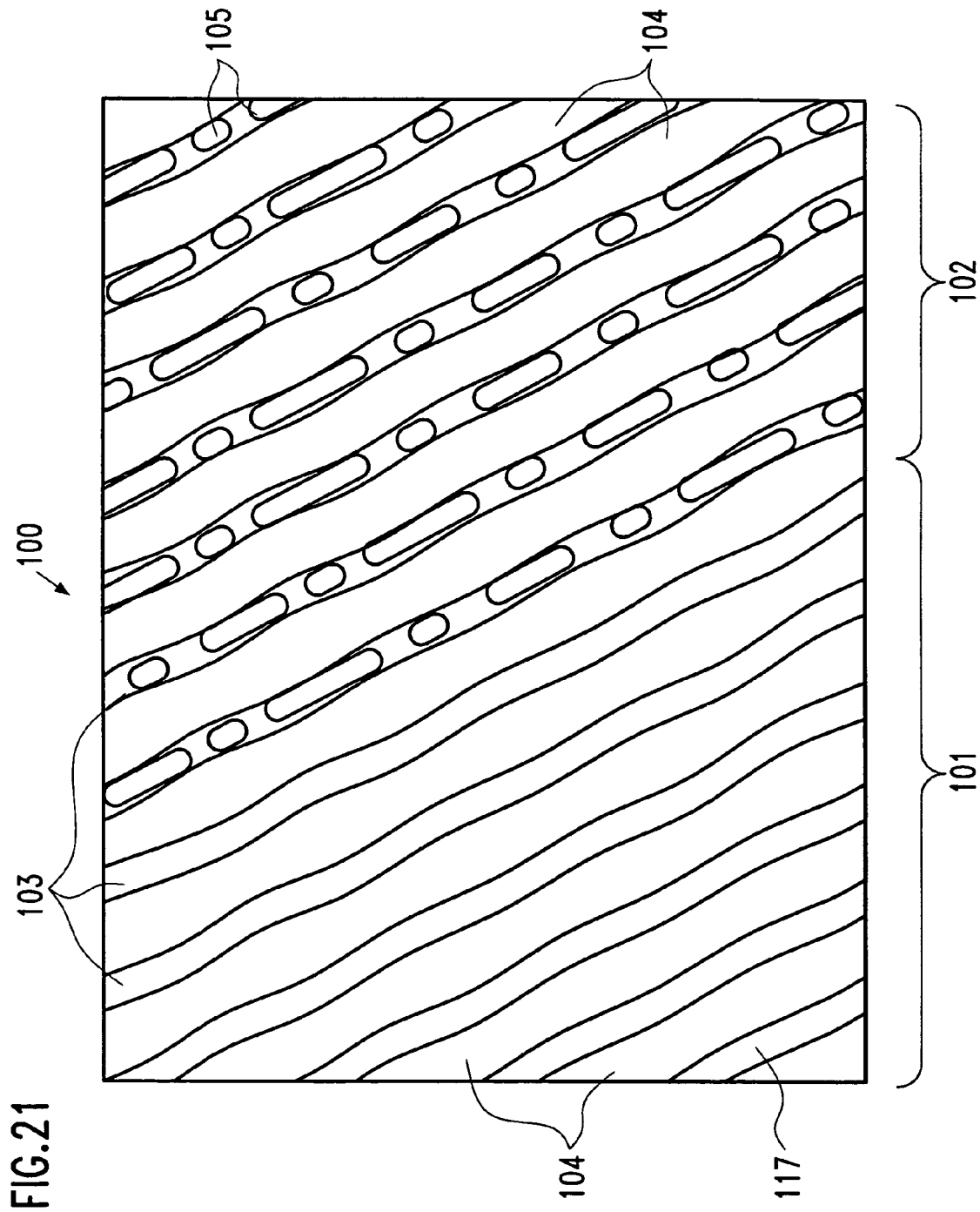
FIG. 21 shows the physical structure of a conventional recordable optical disc which has been partially recorded.

FIG. 21 shows the design of the physical structure which may underly the recordable optical disc shown in FIG. 1. In this case, the physical structure 100 comprises an unrecorded part 101 and a recorded part 102. The physical part 100 comprises grooves 103 and lands 104 positioned between the grooves 103. The difference between the unrecorded part 101 and the recorded part 102 is that within the grooves 103 of the recorded part 102, groove pits 105 are present, which is not the case within the unrecorded part 101. All grooves 103 "together" form a groove spiral 117.

According to the present invention, the physical structure 100 is modified such that modified optical/electrical signals which occur during the recording process and which result from the modified physical structure are not in conformity with the respective specification for the optical disc. This may for example effect that a standard optical disc recorder has laser beam focusing problems and/or cannot read address information/timecode information and/or cannot set a right speed rotation speed, and/or the like. Another effect may be that the laser beam of the standard optical disc recorder looses its track.

Figure 22:
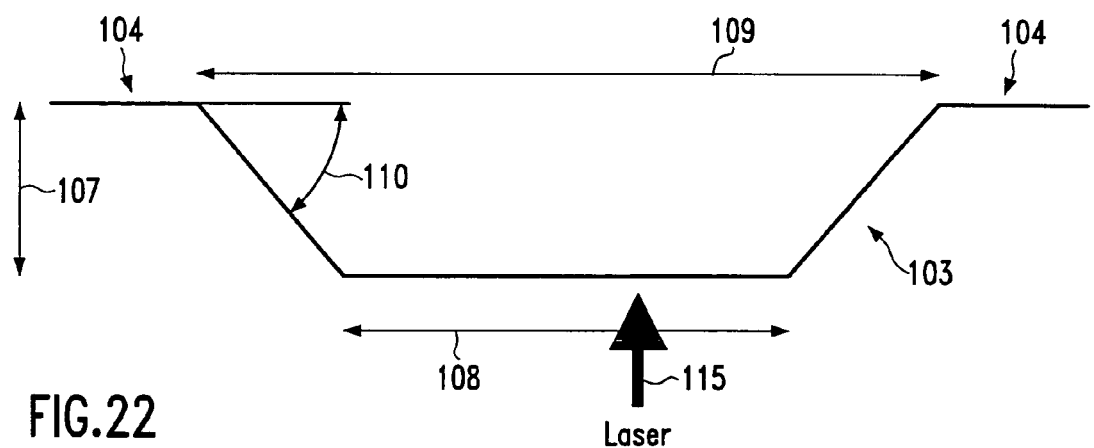
FIG. 22 is a schematical drawing illustrating details of the physical structure shown in FIG. 21.

FIG. 22 shows a schematical drawing illustrating details of the geometry of the grooves 103/lands 104 of the unrecorded part 101 of the physical structure 100. Accordingly, each groove 103 can be characterized by a groove height 107, a groove width (top) 108, a groove width (bottom) 109, and a groove angle 110.

According to an embodiment of the present invention, the non-conformity of the modified optical/electrical signals at least in part results from the width 108, 109 of the grooves 103 and/or the height 107 of the groove 103 and/or the groove angle 110 of the groove 103. That is, the groove parameters (height, width, angle) are chosen such that the optical signals (reflected laser beam (reflected at or near the groove 103)) or the electrical signals into which the optical signals are converted are not in conformity with the respective specification for the optical disc.

Figure 23:
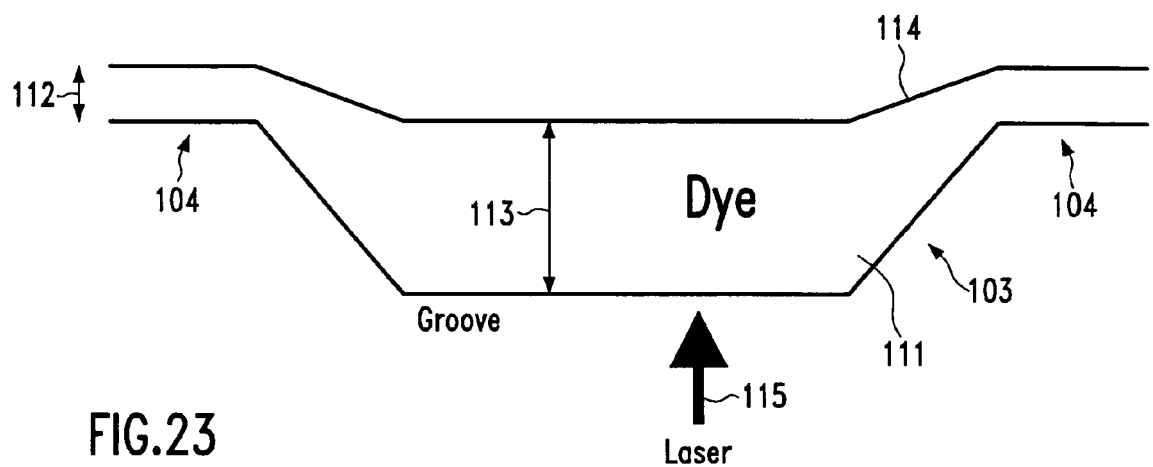
FIG. 23 is a schematical drawing illustrating details of the physical structure shown in FIG. 21.

According to a further preferred embodiment of the present invention, the non-conformity of the modified optical/electrical signals at least in part results from the relation between the thickness of the recordable layer within the groove spiral and the thickness of the recordable layer within other areas of the optical disc. This embodiment is indicated in FIG. 23. A recordable layer 111 is provided within the grooves 103 and on the land 104. The recordable layer 111 shows a first thickness 112 on the lands 104 and a second thickness 113 within the grooves 103. The recordable layer 111 is covered by a reflective layer 114. The relationship between the first layer thickness 112 and the second layer thickness 113 is called "levelling" of the recordable layer 111. According to this embodiment, the optical/electrical signals resulting from the levelling of the recordable layer 111 is not in conformity with the respective specification for the optical disc.

According to a further embodiment of the present invention, the properties of the recordable optical layer 111 are not in conformity with the respective specification for the optical disc. For example, the material ("dye") of the recordable layer 111 may differ from currently used materials like Cyanine, Phthalocyanine, Azo, or combinations thereof. Organic or anorganic materials may be used.

According to an embodiment of the present invention, the recordable layer 111 used within the grooves 103 and on the lands 104 may require a writing laser beam wavelength and/or writing laser beam strength and/or a writing strategy (writing strategies are described in the respective specifications, see for example document ECMA-349, Annex F on page 101 or ECMA-337, Annex F on page 93) which is not in conformity with the respective specification for the optical disc, however requires a reading laser beam wavelength and/or reading laser beam strength which is in conformity with the respective specification for the optical disc. For example, referring to FIG. 23, the laser beam 115 of a compact disc used for recording usually consists of light having a wavelength of 780 nm for both recording and reading. According to an embodiment of the present invention, the material of the recordable layer 111 may be chosen such that a laser wavelength being different from 780 nm is necessary to record data into the recordable layer 111, however, laser light of 780 nm is necessary for reading out data recorded into the recordable layer 111. The same idea may also be applied to the laser beam strength, i.e. the material of the recordable layer 111 may be chosen such that a laser strength being different from the standard writing strength is necessary to record data into the recordable layer 111, however, a laser strength conforming with the standard reading strength is necessary for reading out data recorded into the recordable layer 111.

Figure 24:
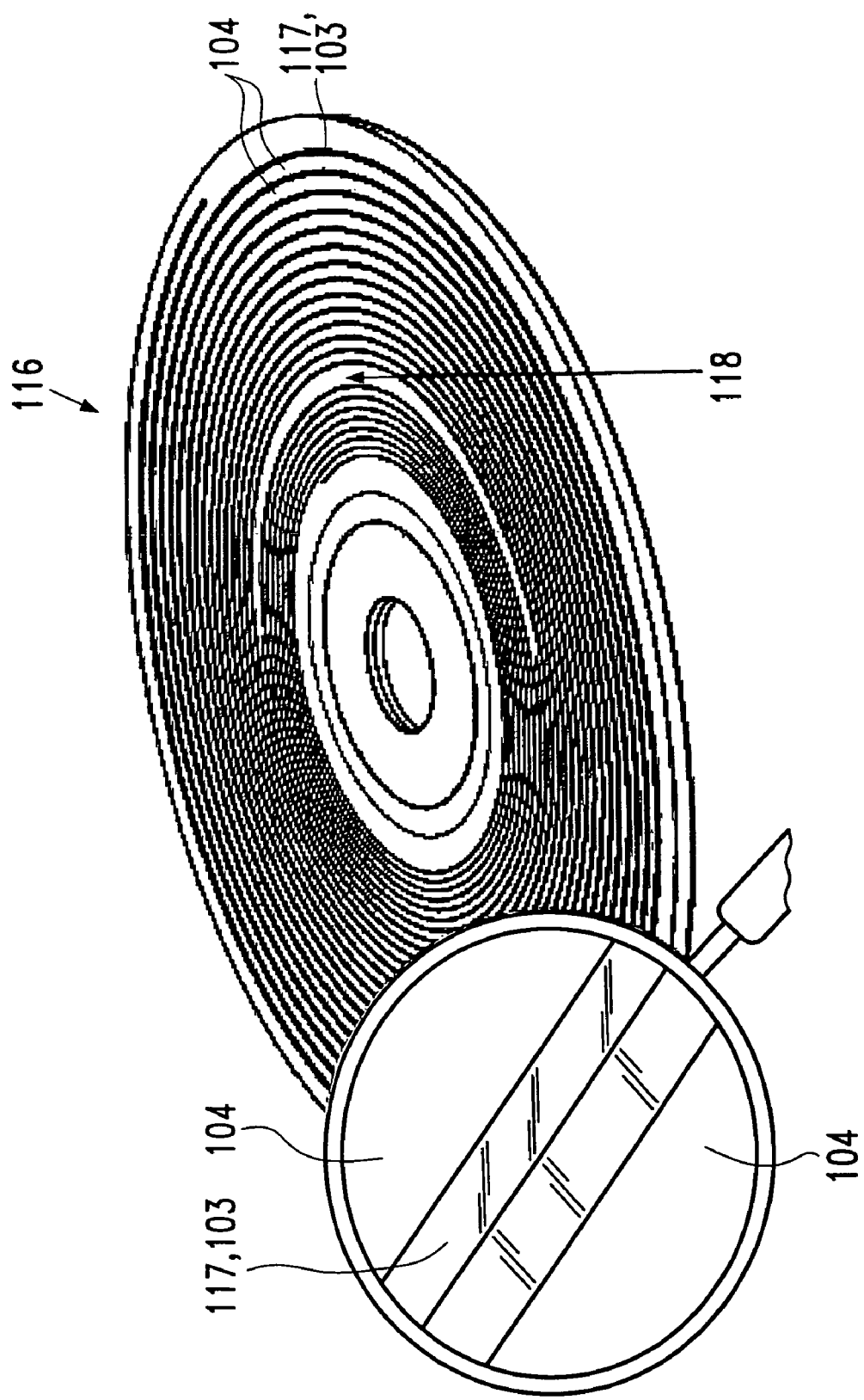
FIG. 24 shows a twentieth embodiment of the recordable optical disc according to the present invention.

According to a further embodiment of the present invention, a part of the groove spiral 117 is missing and/or destroyed within the modified physical structure. This embodiment is illustrated in FIG. 24. A recordable optical disc 116 comprises a groove spiral 117, wherein within a specific part 118 of the recordable optical disc 116 the groove spiral 117 is interrupted. Preferably, the part 118 where no groove exists is located within a part of the recordable optical disc 116 which will be not accessed by the standard optical disc reader after the recording process has been finished. For example, the part 118 may be located within a lead-out area of one of the sessions which will be recorded onto the recordable optical disc 116. The disc recorder according to the present invention, however, is capable of dealing with this situation. For example, a disc recorder may know the exact position of the part 118 and "navigate" around it during the recording process. The part 118 may also be included within a dummy file recorded onto the recordable optical disc. To give an example: The part 118 may start at the timecode/address 02:00:00 and extend until 02:00:10 (one frame; 1/75 s). This would result in a length of the part 118 of about 160 mm which is about one revolution at R 27 mm (periphery=170 mm). To realize this, it would be necessary to generate a first session, the length of which only being 1:00:00. After this session a first part of the lead-out of 1:00:00 is generated until the start of the part 118, and after the end of the part 118 a second part of the lead-out of 00:30:65 is generated to get a total length of 01:30:00. The main data (user data) may then be recorded in a second session.

According to an embodiment of the present invention, the length of the missing and/or destroyed part 118 of the groove spiral 117 may be longer than the maximum tolerable defect diameter according to the respective specification for the optical disc, thereby causing a standard optical disc recorder to loose the track. Further, it may be possible to choose the length of missing and/or destroyed parts 118 of the groove spiral 117 to be longer than the maximum correctable defect length of the optical disc, thereby causing a standard optical disc recorder to loose the track.

Figure 31:
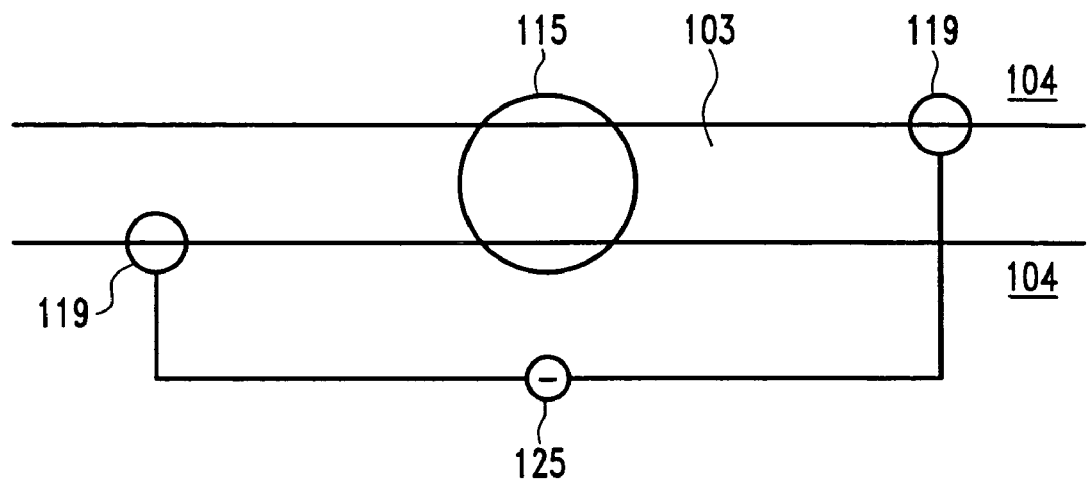
FIG. 31 is a schematic drawing illustrating a twentyfourth embodiment of the recordable optical disc according to the present invention.

According to a further embodiment of the present invention, the shape of at least a part of the groove spiral 117 may deviate from the optimum shape/prescribed shape which effects that the writing laser beam 155 is not centered over a track and/or the electrical signals into which the optical signals are converted are not within the respective specification for the optical disc, thereby causing a standard optical disc recorder to loose its track. This situation is illustrated in FIG. 31. FIG. 31 shows one possibility how a writing laser beam 115 is kept on its track along a groove 103. To do this, the writing laser beam 115 is centered over a track and two additional neighboring laser beams 119 are slightly offset from the center in opposite directions and by an equal amount. In simple words one of the additional laser beams 119 is focused near the upper boarder, one of the additional laser beams is focused near the lower boarder of the groove 103. The intensity of the reflected light of the additional laser beams 119 are compared with each other in a comparing unit 125. The recording laser beam 115 is centered/on its track if the difference between the intensities of the reflected light of the additional laser beams 119 is zero. According to the present invention, for example the groove angle 110 of the groove 103 may be changed at one of the groove boarders, thereby obtaining different groove angles of the groove boarders. As a consequence, the intensities of the reflected light of the additional laser beams 119 would not be identical although the recording laser beam 115 is centered, thereby confusing the standard optical disc recorder. Only a modified recorder according to the present invention "knows" that the recording laser beam 115 is correctly centered if the difference between the intensities is not zero and is capable of keeping the laser beam 115 on its track. Preferably, the groove spiral deviates from its optimum shape within parts of the optical disc which are not read-out by a standard optical disc recorder after recording, as already discussed above.

Figure 32:
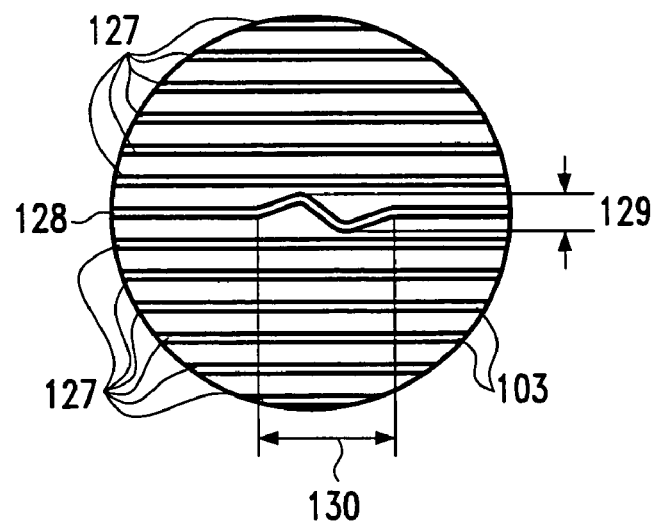
FIG. 32 is a schematic drawing illustrating a twentyfifth embodiment of the recordable optical disc according to the present invention.

According to an embodiment of the present invention the groove spiral is not following the ideal way but deviates in the radial direction with a certain period and amplitude. The residual tracking error caused by the deviation from the ideal way of the groove spiral 117 is above the residual track error limit according to the respective specification for the optical disc, thereby causing a standard optical disc recorder to loose its track. An example of this embodiment is shown in FIG. 32: a part of a recordable optical disc comprises "normal" shaped grooves 127 and one special shaped groove 128 having a deviation (sine wave) of a specific amplitude 129 within a specific period 130. When a standard recorder tries to record data into the special shaped groove 128, it is likely that the recorder looses its track within the period 130 if the amplitude 129 exceeds a specific threshold value.

According to an embodiment of the present invention, at least a part of the modified physical structure relates to a physical structure from which physical location information along the groove spiral 117 is derived. For example, at least a part of the modified physical structure may relate to a physical structure from which ATIP timecode information or ADIP/LPP address code information is derived.

In most conventional recordable optical discs physical location information along the groove spiral is included within the wobbled shape of the groove spiral. For example, referring to FIG. 21, physical location information along the groove spiral is included within the wobbling shape and/or wobbling frequency and/or the wobbling amplitude of the boarders of the grooves 103/the boarders of the lands 104. Conventional optical disc recorders use this information in order to set the right rotational speed and/or to locate a specific part of the recordable optical disc.

According to an embodiment of the present invention, at least a part of the groove spiral 117 does not show a wobbled shape within the modified physical structure. Instead, information which would be normally contained within the wobbled shape/wobbling amplitude/wobbling frequency is included within other physical structure elements or is completely missing. Thus, a standard optical disc recorder will be confused when trying to access data. He expects this data to be included within a wobbled groove spiral which, however, does not show a wobbled shape.

According to an embodiment of the present invention, within the modified physical structure, at least a part of the groove spiral shows a wobbled shape, the wobbling parameters which characterize the wobbled shape, however, not being in conformity with the respective specification for the optical disc. For example, the wobbling shape and/or wobbling frequency and/or the wobbling amplitude may not be in conformity with the respective specification for the optical disc. The wobbling frequency may for example be lower than the wobbling frequency according to the respective specification for the optical disc but higher than the maximum frequency of the radial tracking servo according to the respective specification for the optical disc. The wobbling frequency may for example be higher than the wobbling frequency according to the respective specification for the optical disc.

According to an embodiment of the present invention, within the modified physical structure, the groove spiral shows a wobbled shape wherein the wobbling parameters which characterize the wobbled shape are in conformity within the respective specification for the optical disc. However, no physical location information/other type of information is encoded within the wobbling shape and/or the wobbling frequency and/or the wobbling amplitude. For example, within at least a part of the modified physical structure, no ATIP timecode information or ADIP/LPP address code information is included within the wobbling shape and/or the wobbling frequency and/or the wobbling amplitude of the groove spiral.

As already indicated, physical location information along the groove and/or other type of information may not be included within the wobbling shape and/or the wobbling frequency and/or the wobbling amplitude, but included within additional physical structure elements which are not in conformity with the respective specification for the optical disc. For example, within at least a part of the modified physical structure, the ATIP timecode information or ADIP/LPP address code information may not be included within the wobbling shape and/or the wobbling frequency and/or the wobbling amplitude of the groove spiral, but included within additional physical structure elements which are not in conformity with the respective specification for the optical disc.

Figure 25:
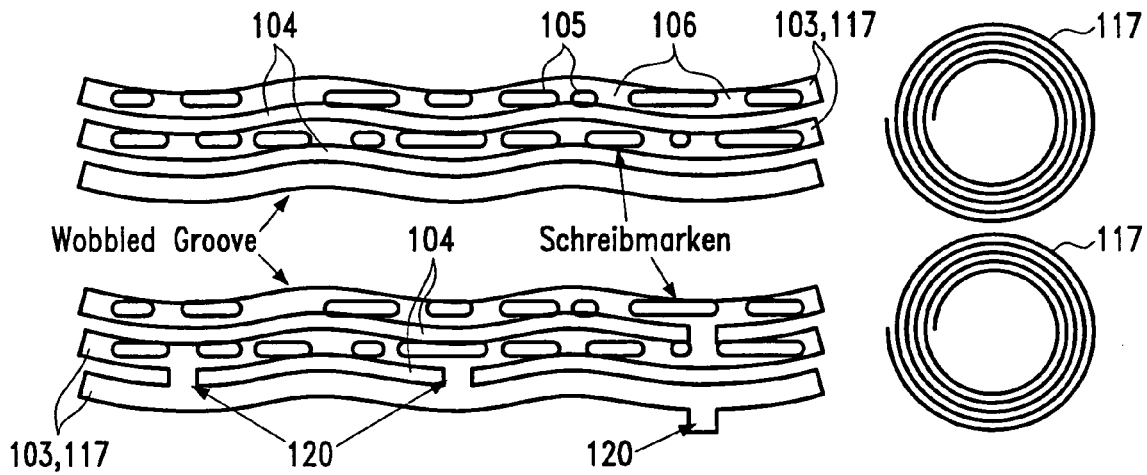
FIG. 25 shows a twentyfirst embodiment of the recordable optical disc according to the present invention.
Figure 26:
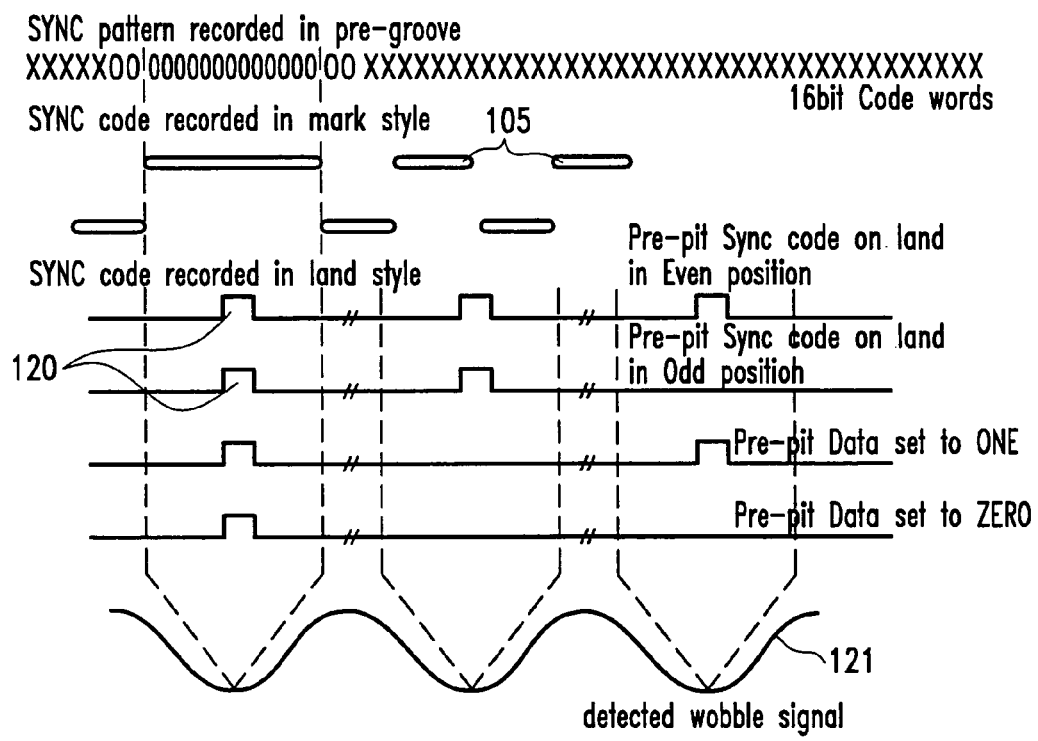
FIG. 26 shows a possible application of the embodiment shown in FIG. 25.
Figure 28:
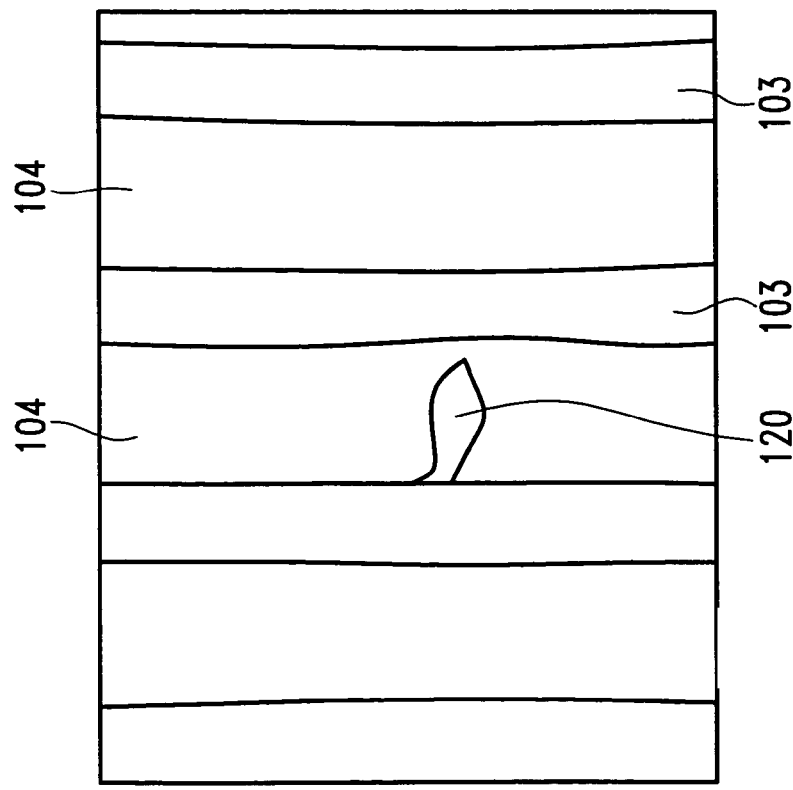
FIG. 28 shows a possible realization of the embodiment shown in FIG. 25.
Figure 29:
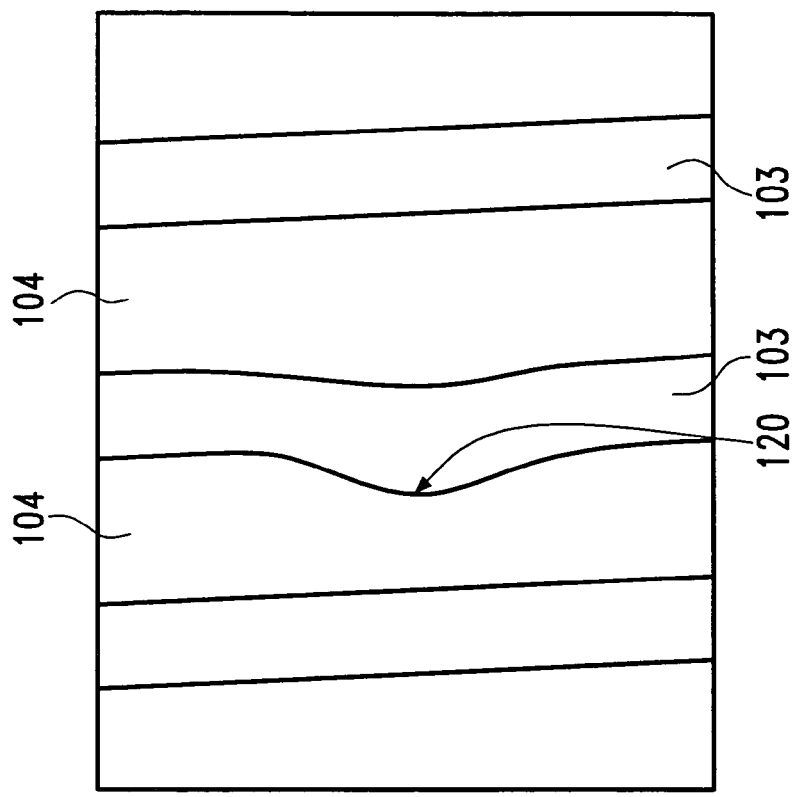
FIG. 29 shows a possible realization of the embodiment shown in FIG. 25.

Additional physical structure elements may for example be prepits located within the groove spiral. Further, as shown in FIG. 25, the additional physical structure elements may be land prepits 120 located within the land 104 at predetermined positions. FIG. 26 illustrates how data may be encoded using a combination of land prepits 120 and a wobbled shape 121 of the groove spiral 117. FIGS. 28 and 29 show possible realizations of land prepits 120. FIG. 28 for example shows the case where land prepits 120 are realized in form of pits within the land 104, wereas FIG. 29 shows the case wherein the land prepits 120 are realized in form of a curved boarder of the land 104/the grooves 103.

Figure 27:
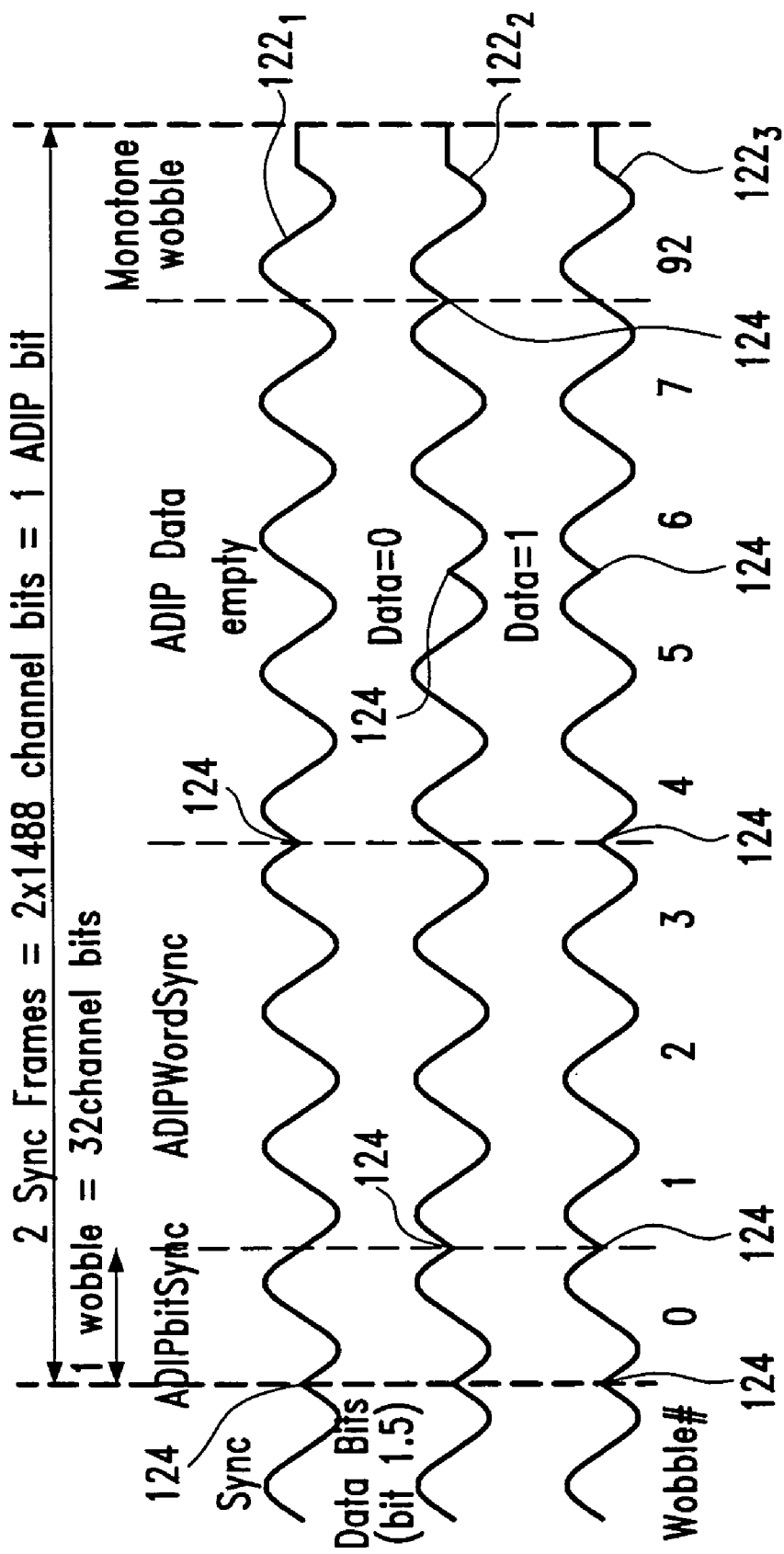
FIG. 27 shows a twentysecond embodiment of the recordable optical disc according to the present invention.

The additional physical structure elements may also be realized by a physical structure element showing a phase-modulated sine-waved form along the groove spiral 117. This case is illustrated in FIG. 27, where different phase-modulated sine-waved forms 122 of an additional physical structure element are shown. Physical location information and/or other information may then be derived from the phase-modulations of the sine-waved forms of the additional physical structure elements.

Figure 30:
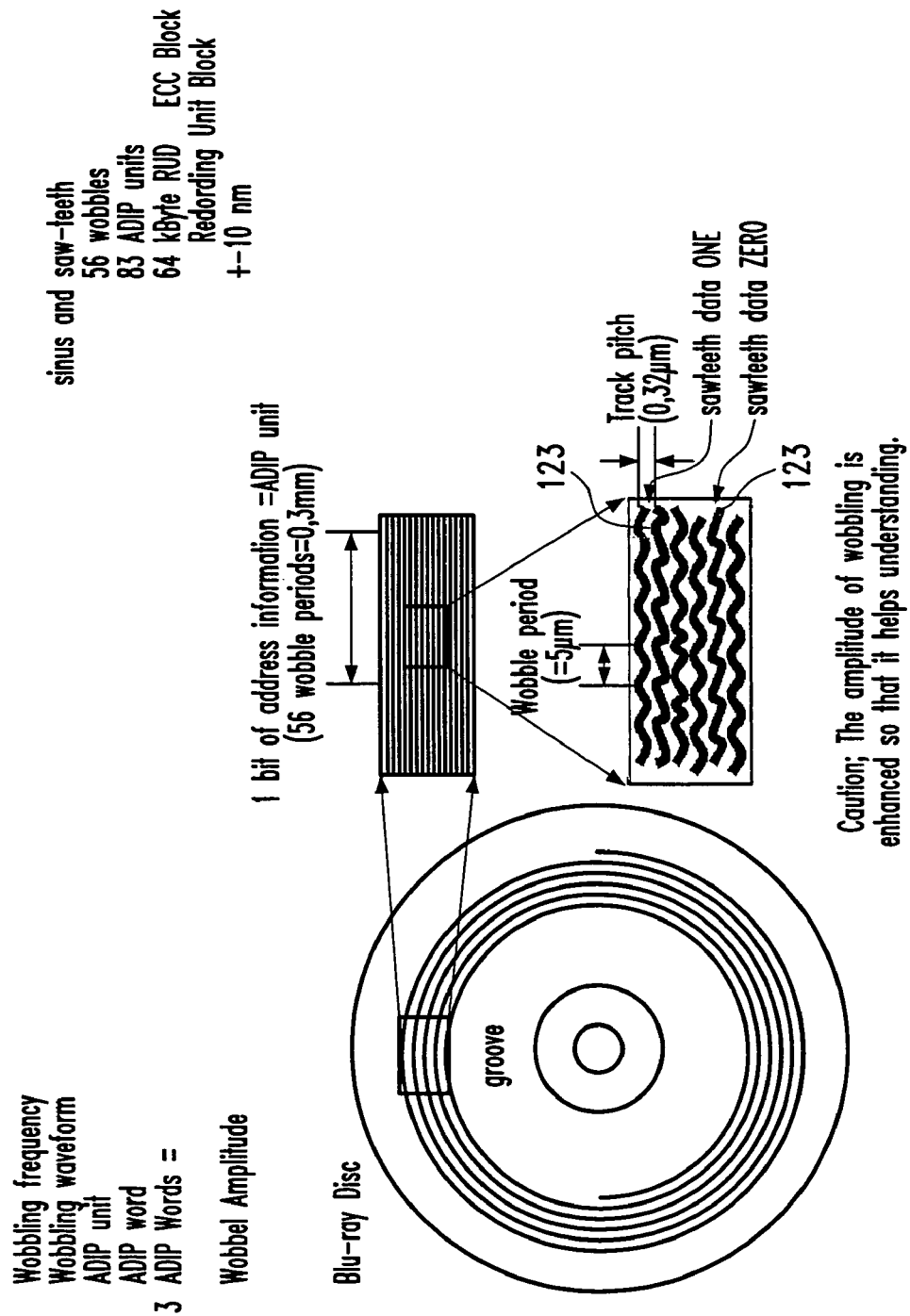
FIG. 30 shows a twentythird embodiment of the recordable optical disc according to the present invention.

The additional physical structure elements may also be realized in form of physical structure elements showing a saw-teeth-modulated sine-waved form along the groove spiral 117. Such a wave form is for example shown in FIG. 30 and denoted with reference numeral 123.

The additional physical structure elements may also be realized in form of a frequency-modulated sine-waved form along the groove spiral.

All additional physical structure elements may be located within the groove spiral 117 (the additional physical structure elements may constitute the "vertical" boarders between the grooves 103 and the lands 104) or be located at different positions, for example within or onto the land 104s.

In the sense of the present invention, the term "controlling data area" may mean, as already discussed, areas which are referenced by reference numerals 6, 8, 10 and 11 in FIG. 1; further, this term also relates to physical structure elements like the wobbled shape of the grooves 103/the wobbled shapes of the land 104 (in this case, "controlling data area" also includes "parts" of the user data areas referenced with reference numerals $12_1$ to $12_5$ in FIG. 1).

All embodiments described above may be combined in an arbitrary manner with each other.

According to a second aspect of the present invention, the recordable optical disc according to the present invention comprises at least one user data area for storing user data, and at least one controlling data area for storing controlling data necessary for accessing stored user data and/or for recording user data into the user data areas. At least a part of at least one controlling data area comprises prestored controlling data and/or at least a part of at least one user data area comprises user data which is interpreted by a standard optical disc recorder such that user data cannot be recorded by the standard optical disc recorder into at least a part of at least one user data area, and/or which is interpreted by a standard optical disc recorder such that user data of at least a part of at least one user data area cannot be read by a standard optical disc reader if the standard optical disc recorder can record data into at least one user data area.

Referring to FIG. 1, according to this aspect, some of the data recorded within the controlling data areas of the information area 2 comprises controlling data which is interpreted by a standard optical disc recorder such that user data cannot be recorded by a standard optical disc recorder into the user data area $12_5$, and/or which is interpreted by a standard optical disc reader such that user data of at least a part of the user data area $12_5$ cannot be read by a standard optical disc reader if the standard optical disc recorder can record data into the user data area $12_5$.

The prestored controlling data for example comprises data which is not in conformity with the respective specification for the optical disc and/or which is not consistent with user data or other data stored/to be stored on/onto the optical disc and/or which is not consistent with physical properties of the optical disc, and/or which does not include data needed according to the respective specification for the optical disc for accessing stored user data and/or for recording user data into the user data areas. In the context of FIG. 1, the prestored controlling data would correspond to data stored within the lead-in areas 6 (LIA1, LIA2, LIA3), the lead-out areas 8 (LOA1. LOA2, LOA3), the PCA area 10 and the PMA area 11; the user data would correspond to data to be stored within the user data area $12_5$.

According to an embodiment of the present invention, the prestored controlling data comprises timecode information (CD)/address information (DVD). For example, the timecode information/address information may be organized in data frame structures which are not in conformity with the respective specification for the optical disc. An example of such an embodiment is shown in FIG. 12: The upper part of FIG. 12 shows a data frame structure 40 which is normally used to organize ATIP information of CD-R/RW compact discs. The data frame structure 40 comprises five data blocks $41_1$ to $41_5$, wherein the first data block $41_1$ comprises four data bits, the second, third and fourth data block $41_2$ to $41_4$ comprise eight data bits, respectively, and the fifth data block $41_5$ comprises fourteen data bits. According to the present invention, the data frame structure 40 may be modified to become the modified data frame structure 42. The modified data frame structure 42 comprises four data blocks $43_1$ to $43_4$, wherein the first data block $43_1$ comprises eight data bits, the second data block $43_2$ comprises six data bits, the third data block $43_3$ comprises nineteen data bits, and the fourth data block $43_4$ comprises fourteen data bits. Arbitrary modifications of the data frame structure 40 are possible. Similar modifications may also be done with respect to ADIP data frame structures (DVD+R) and LPP data frame structures (DVD-R).

As indicated in the last paragraph, the prestored controlling data may comprise ATIP timecode data of a compact disc or ADIP/LPP address code data of a DVD which is not in conformity with ATIP timecode data specification requirements or ADIP/LPP address code data specification requirements. In the following paragraph, another example of this embodiment will be given:

According to an embodiment of the present invention, the ATIP timecode is kept on a fixed ATIP timecode value over a specific ATIP timecode range and/or the ATIP timecode decrements over a specific ATIP timecode range, and/or a positive and/or a negative ATIP timecode jump is included within the ATIP timecode data and/or a specific ATIP timecode range necessary according to the respective specification for the optical disc is not included within the ATIP timecode data. Corresponding thereto, according to an embodiment of the present invention, the ADIP/LPP address code is kept on a fixed ADIP/LPP address code value over a ADIP/LPP specific address code range, and/or the ADIP/LPP address code decrements over a specific ADIP/LPP address code range when it should increment according to the respective specification for the optical disc and/or the ADIP/LPP address code increments over a specific ADIP/LPP address code range when it should decrement according to the respective specification for the optical disc, and/or a positive and/or a negative address code jump is included within the ADIP/LPP address code data and/or a specific ADIP/LPP address code range necessary according to the respective specification for the optical disc is not included within the ADIP/LPP address code data.

The embodiments described in the paragraph above are shown in FIGS. 2 to 6.

Figure 2:
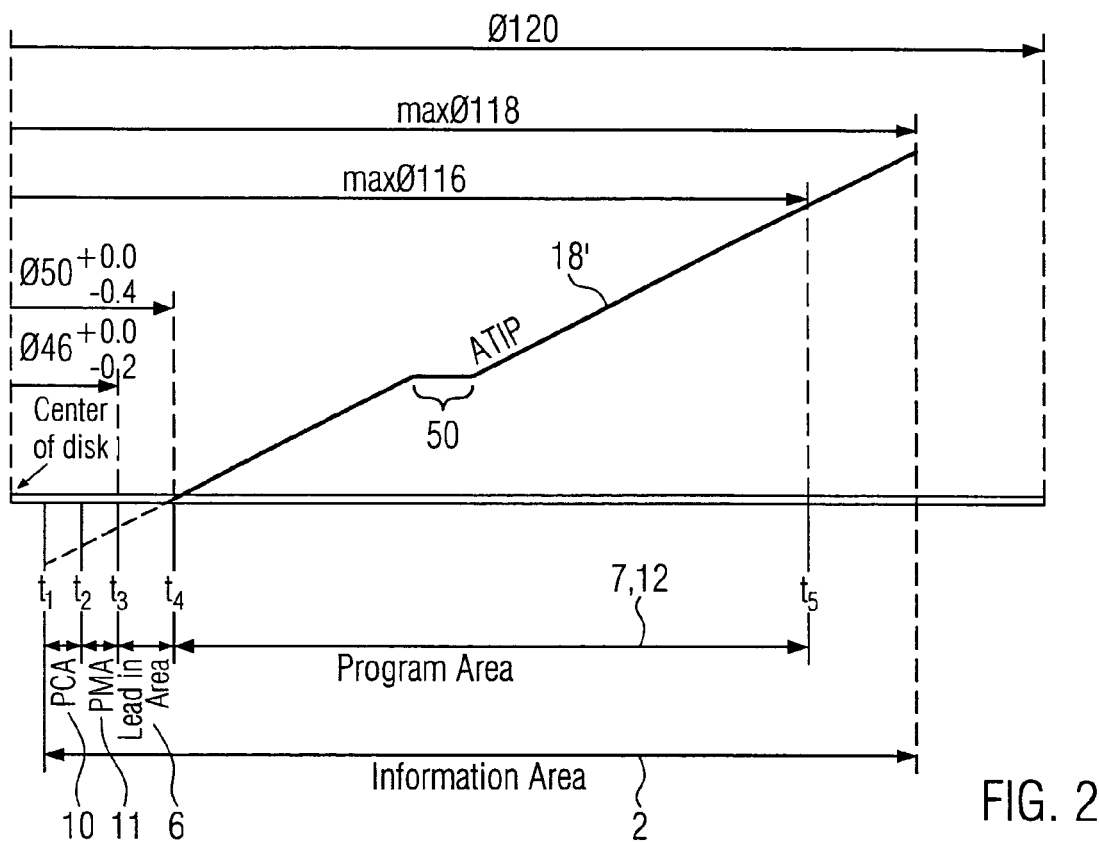
FIG. 2 shows a first embodiment of the recordable optical disc according to the present invention.

FIG. 2 shows the case where the ATIP timecode 18 is kept on a fixed ATIP timecode value over the ATIP timecode range 50. Corresponding thereto, the ADIP address code/LPP address code may be kept on a fixed address code value over a specific ADIP/LPP address code range (not shown).

Figure 3:
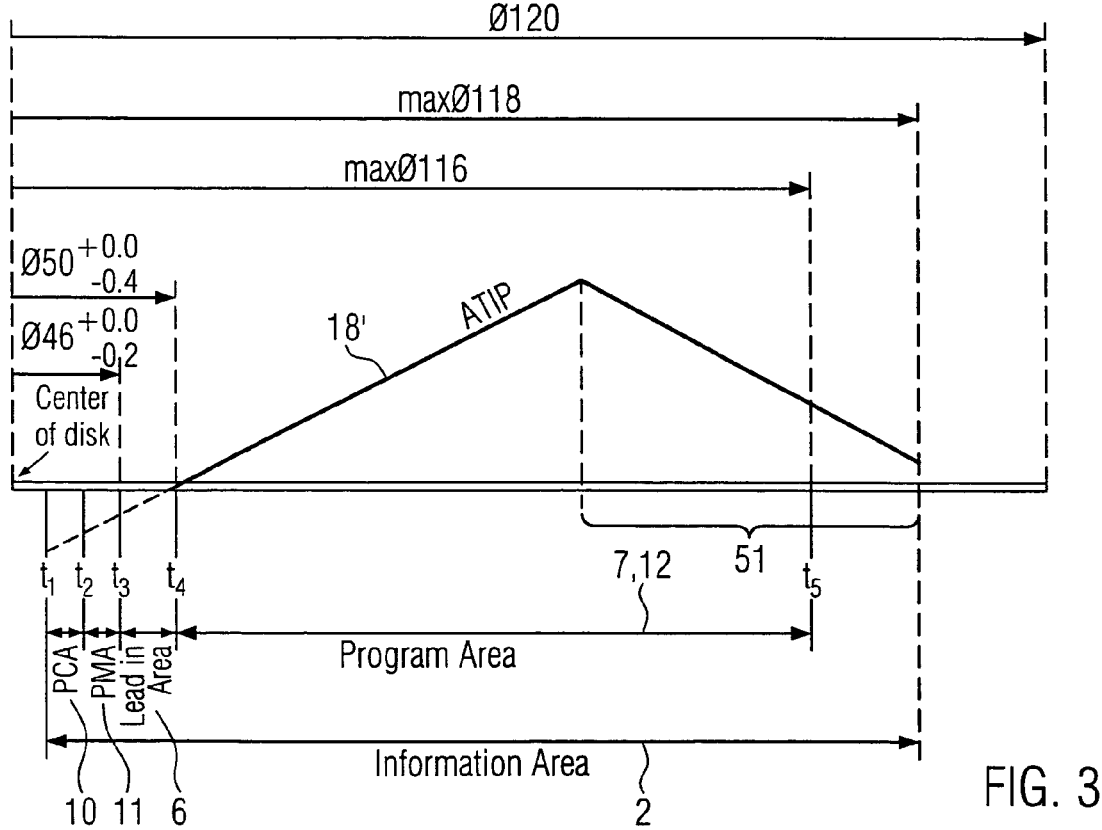
FIG. 3 shows a second embodiment of the recordable optical disc according to the present invention.

FIG. 3 shows the case where the ATIP timecode 18 decrements in an ATIP timecode range 51, in which, however, the ATIP timecode 18 should increment. This can also be applied to ADIP address code/LPP address code. "Increment"/"decrement" in this context in particular means that the next timecode (min:sec:fr) is the current timecode reduced/increased by one frame (CD-R/RW)/the next address is the current address reduced/increased by one frame (DVD-R/+R).

Figure 4:
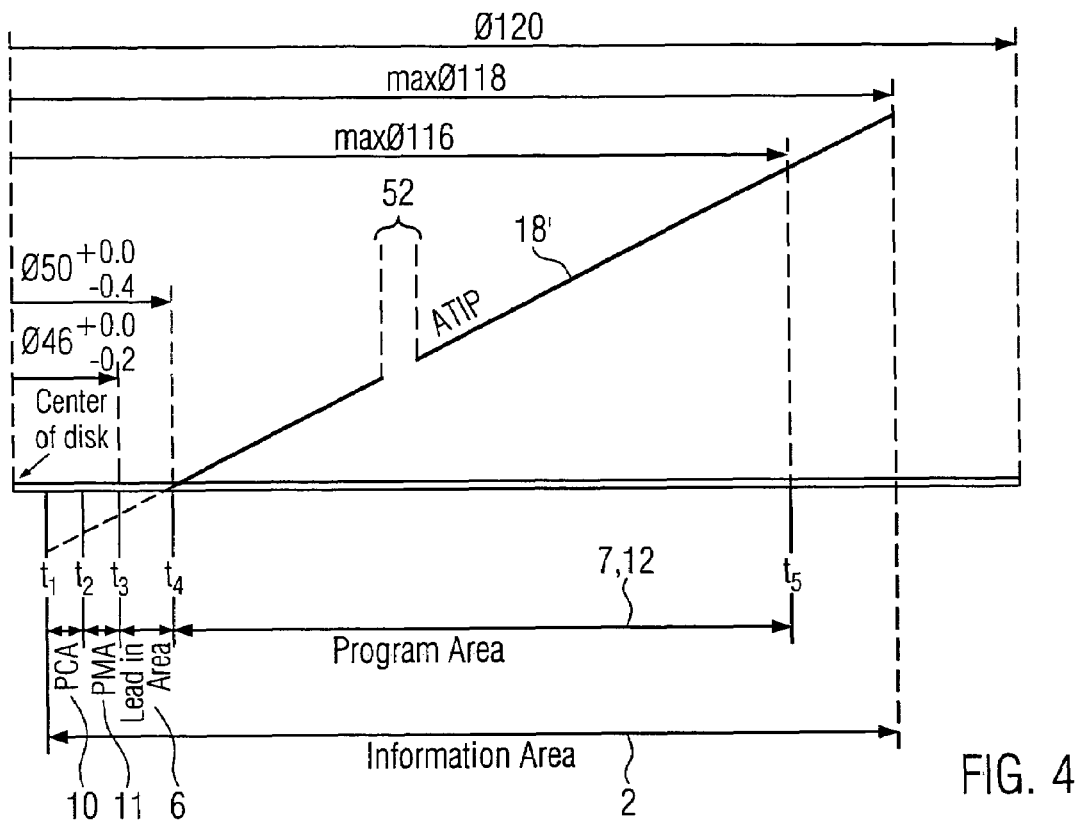
FIG. 4 shows a third embodiment of the recordable optical disc according to the present invention.

FIG. 4 shows the case where a specific ATIP timecode range 52 necessary according to the respective specification for the optical disc is not included within the ATIP timecode data. The omission of the ATIP timecode range 52 can for example be realized in the following ways: a) There is no ATIP timecode information at all (this can be realized as follows: there is no frequency modulation of the frequency of the wobbles of the grooves or there is no wobbling of the grooves at all b) parts of the ATIP timecode information are missing (for example, only correct synchronization bits and CRC bits are available, the rest of the bits of the data frames are set to zero or all bits are set to zero). This can also be applied to ADIP address code/LPP address code (no wobbling of the grooves at all and/or only ADIP Sync units present or no phase inversions at all or only Sync LPPs present or no LPPs at all).

Figure 5:
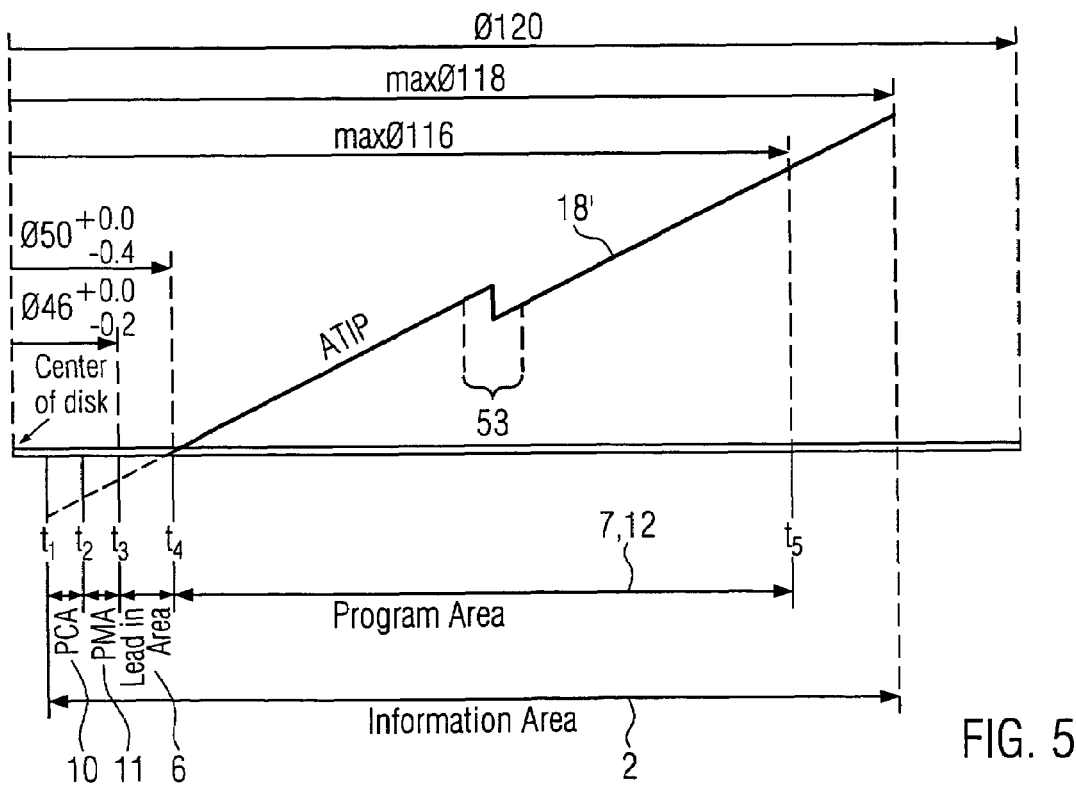
FIG. 5 shows a fourth embodiment of the recordable optical disc according to the present invention.
Figure 6:
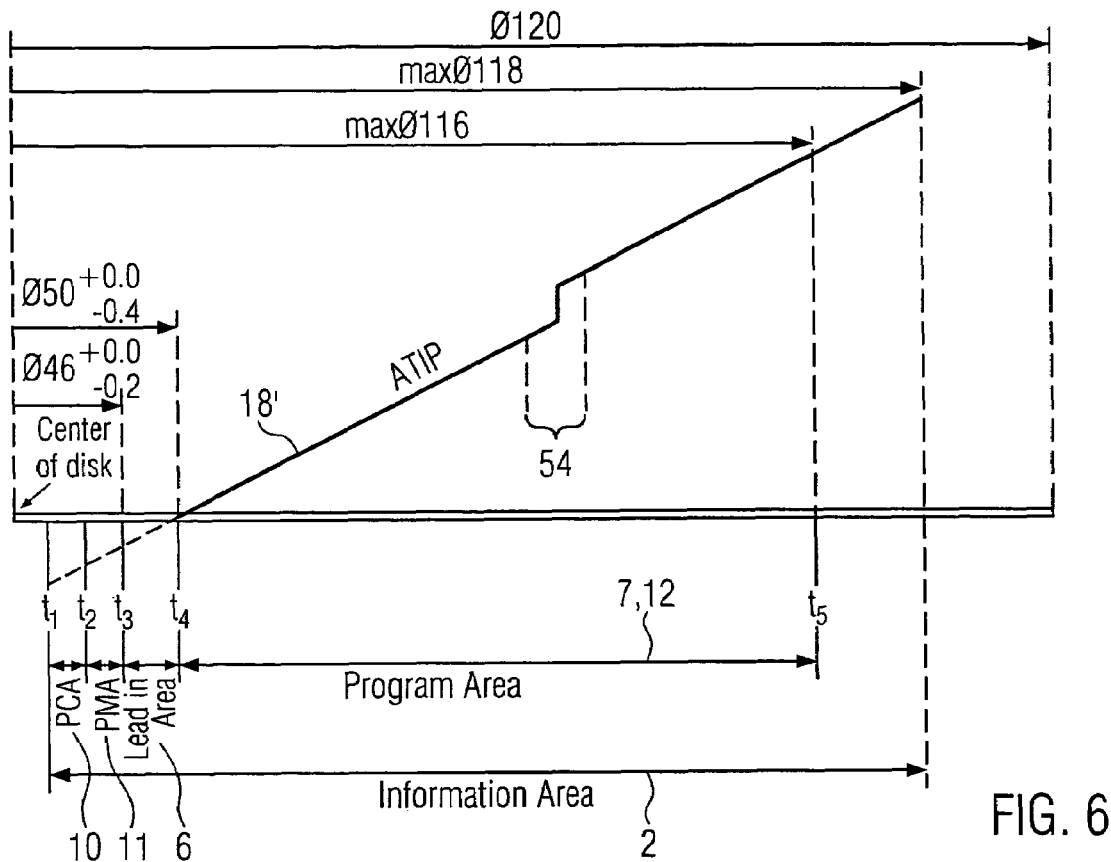
FIG. 6 shows a fifth embodiment of the recordable optical disc according to the present invention.

FIG. 5 shows the case where the ATIP timecode 18 includes a negative timecode jump within the ATIP timecode range 53. In the same way, FIG. 6 shows the case where a positive ATIP timecode jump is included in the ATIP timecode data within the ATIP timecode range 54. This can also be applied to ADIP address code/LPP address code. A positive timecode jump means in this context that the next timecode (min:sec:fr) is the current timecode plus more than one frame (CD-R/RW)/the next address is the current address plus more than 1 (DVD-R/+R). A negative timecode means in this context that the next timecode (min:sec:fr) is the current timecode minus more than one frame (CD-R/RW)/the next address is the current address minor more than 1 (DVD-R/+R).

Figure 18:
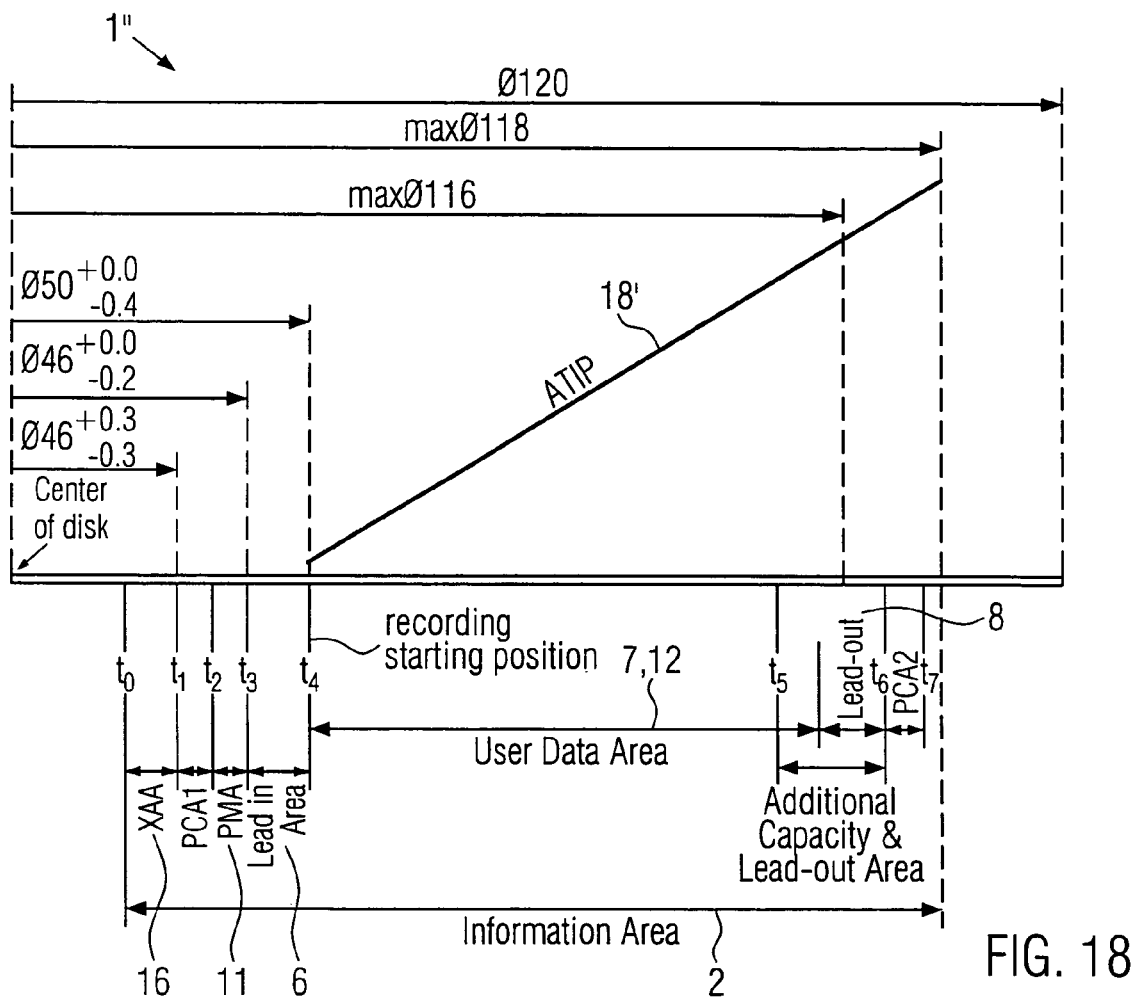
FIG. 18 shows a sixteenth embodiment of the recordable optical disc according to the present invention.

According to an embodiment of the present invention, the specific ATIP timecode range/address code range not included within the ATIP timecode data/address code data falls within a timecode range/address code range assigned to the recording starting address of the compact disc/DVD. FIG. 18 shows an example of this embodiment:

FIG. 18 shows a compact disc 1" in which each physical position of the compact disc is represented by ATIP timecode data 18'. Normally, the recording starting address of the first track (indicated by the parameter $t_4$) coincides with the ATIP timecode 00:00:00. However, according to the embodiment shown in FIG. 18, the recording starting address is missing, i.e. the ATIP timecode 00:00:00 does not exist. As a consequence, a standard optical disc recorder which needs to find the ATIP timecode 00:00:00 will refuse to record data into the user data area 12 since it does not find said ATIP timecode. In contrast, an optical disc recorder according to the present invention knows that the recording starting address for the first track is not represented by the ATIP timecode 00:00:00, but another suitable timecode like 00:01:00.

This concept may also be applied to other timecode data like the starting address of the PCA test area 17, the PCA count area 18, the PMA area 11 or the lead-in area 6, i.e. the ATIP starting address of these areas may be changed to a value being not in conformity with respective specifications.

According to an embodiment of the present invention, the prestored controlling data comprises data assigned to a specific data address range, wherein the specific data address range does not fulfill specification requirements associated with the data to which the specific data address range is assigned.

Figure 16:
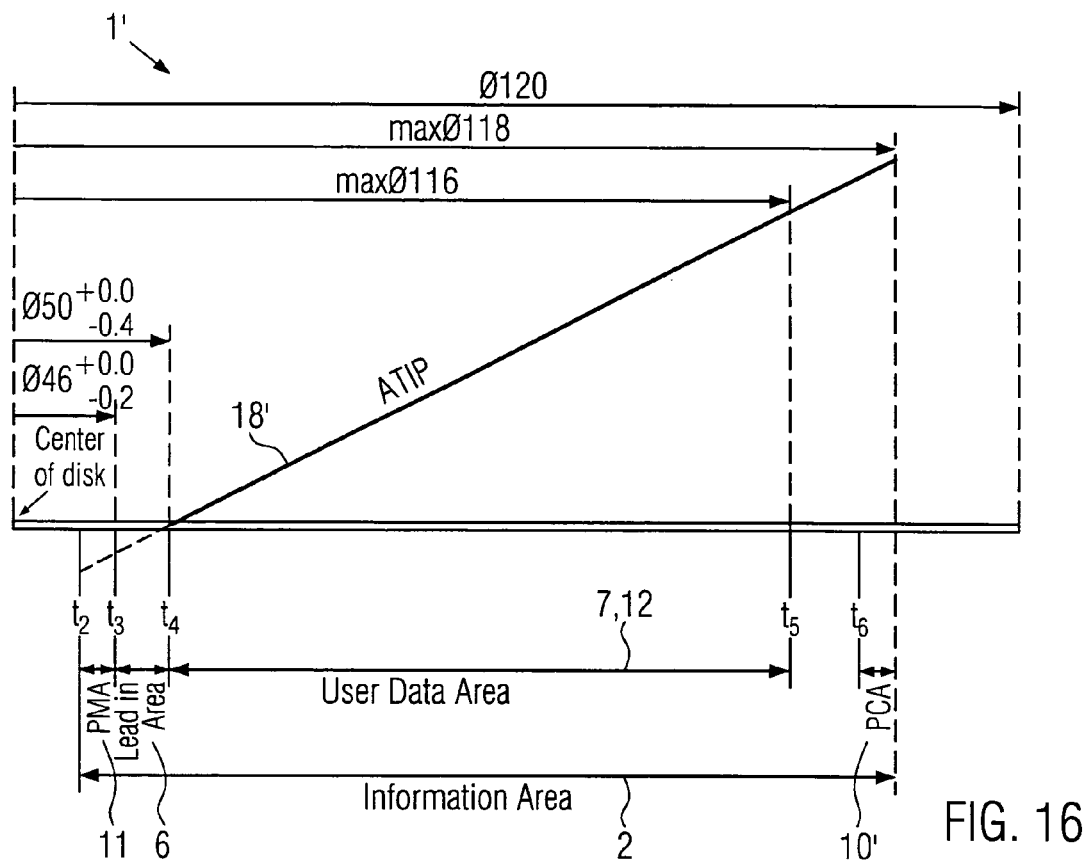
FIG. 16 shows a fifteenth embodiment of the recordable optical disc according to the present invention.

In this embodiment, a program memory area of a compact disc or a table of content zone and/or a recording management area of a recordable DVD is missing, partially or completely recorded or located at a position which is not in conformity with the respective specification for the optical disc. Correspondingly thereto, according to an embodiment of the present invention, a power calibration area of a compact disc or an inner disc test zone and/or a count zone run-in and/or an inner disc count zone and/or a power calibration area of a recordable DVD is missing, partially or completely recorded or located at a position which is not in conformity with the respective specification for the optical disc. An example of this embodiment is shown in FIG. 16:

In this embodiment, the complete PCA area 10 at the beginning of the compact disc 1' is omitted. Rather, a PCA area 10' is provided at the end of the compact disc 1'. Alternatively, only a part of the PCA area 10 at the beginning of the compact disc 1' may be omitted. In accordance with the specification, a standard optical disc recorder expects the PCA area 10 at the beginning of the information area 2 and therefore cannot perform the power calibration tasks, thereby rejecting to record user data into the user data area 12 and/or TOC data into the lead-in area 6. The optical disc recorder according to the present invention, however, is capable to perform all of the power calibration tasks or a part of the power calibration tasks at another position within the information area 2, e.g. at the end of the information area 2 (PCA area 10') or at the start of the lead-in area 6 in order to record data into the information area 2. The optical disc recorder according to the present invention may also be capable of performing the power calibration tasks in multiple steps at multiple locations within the information area 2.

Figure 17:
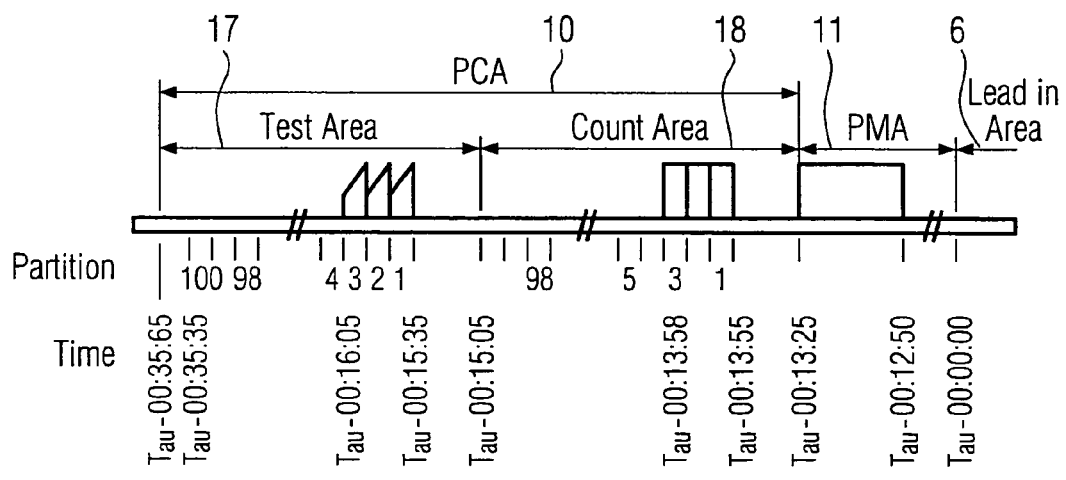
FIG. 17 elucidates a more detailed view of a part of the embodiment shown in FIG. 16.

In FIG. 17 a more detailed view of an ordinary PCA area 10 is shown. The PCA area 10 comprises a test area 17 and a count area 18. As already mentioned and as indicated in FIG. 17, the PCA area 10 is normally located before the PMA area 11 at the beginning of the information area 2. According to the present invention, the complete PCA area 10 may be omitted. Alternatively, it may be possible that only the test area 17 is omitted. In this case, the count area 18 is still located before the PMA area 11. The optical disc recorder according to the present invention may perform the necessary power calibration tasks (which normally take place in the test area 17) at another position within the information area 2, however still using the count area 18 located before the PMA area 11 as usual. A standard optical disc recorder will not be capable of recording user data into the user data area 12 and/or TOC data into the lead-in area 6 since it does not find the test area 17 of the PCA area 10, therefore cannot perform the power calibration tasks and therefore rejects to record user data into the user data area 12 and/or TOC data into the lead-in area 6.

As already indicated in conjunction with FIG. 1, the recordable optical disc according to the present invention may comprise user data areas which are already filled with prestored user data. Alternatively, the recordable optical disc according to the present invention may be completely "empty", i.e. none of the user data areas is filled/partly filled with prestored user data. In the following description, it is assumed that at least part of at least one user data area comprises prestored user data.

According to an embodiment of the present invention, the prestored controlling data comprises data assigned to the prestored user data which is not consistent with the prestored user data. For example, the prestored controlling data not being consistent with the prestored user data is located within the program memory area of a compact disc or within a table of contents zone and/or a recording management area of a recordable DVD and/or within a lead-in area/lead-in zone of a compact disc/a recordable DVD. The prestored controlling data may comprise control data, in particular control bit data which is not consistent within the prestored user data.

According to an embodiment of the present invention, the prestored controlling data located within the lead-in area/lead-in zone of a compact disc/a recordable DVD is not consistent with prestored controlling data located within the program memory area of a compact disc or within a table of content zone and/or a recordable management area of a recordable DVD.

Figure 7:
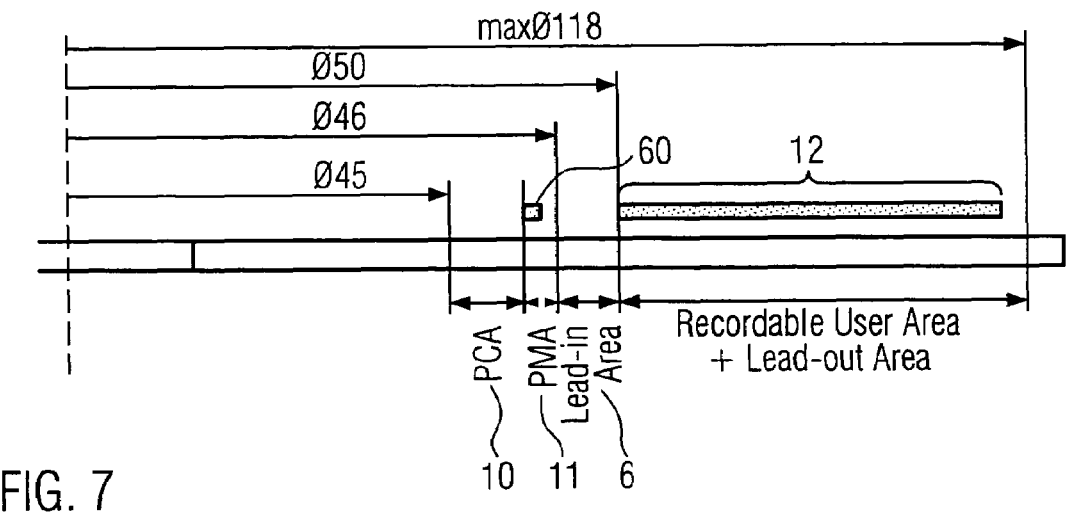
FIG. 7 shows a sixth embodiment of the recordable optical disc according to the present invention.
Figure 8:
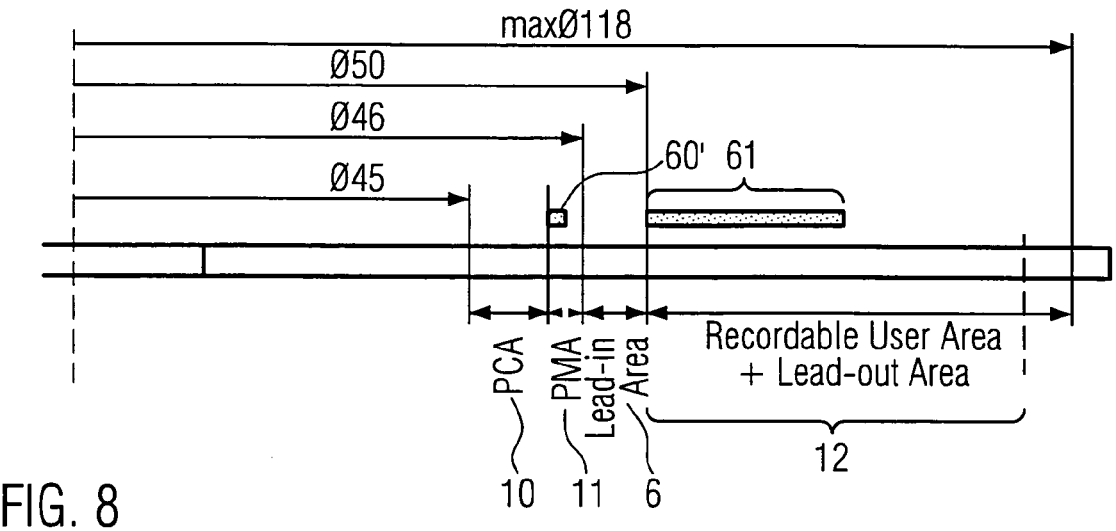
FIG. 8 shows a seventh embodiment of the recordable optical disc according to the present invention.
Figure 9:
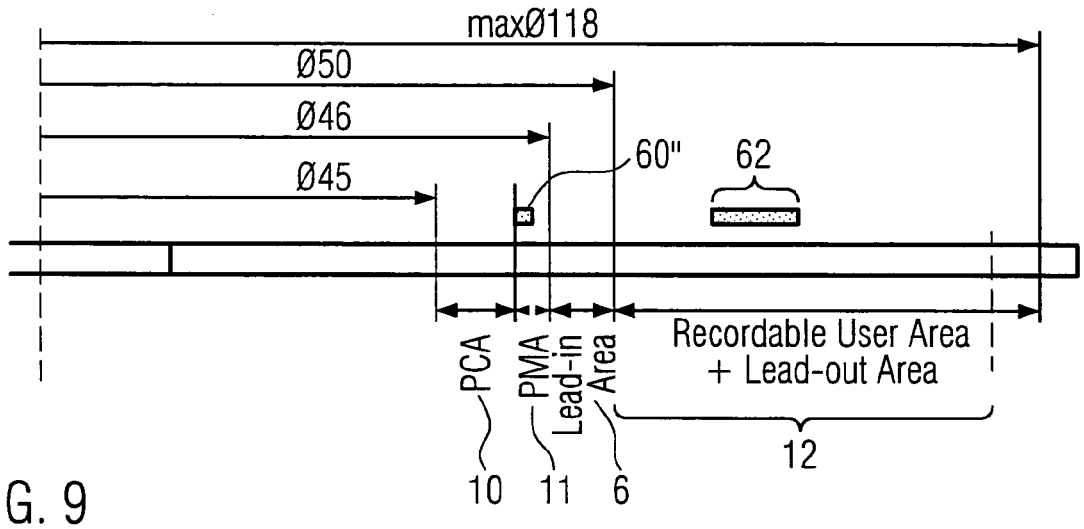
FIG. 9 shows an eighth embodiment of the recordable optical disc according to the present invention.

According to an embodiment of the present invention, the prestored controlling data comprises data which indicates to a standard optical disc recorder that all user data areas or at least a respective part thereof have already been filled with user data although said user data areas or parts thereof have not been filled with user data. This situation is shown in FIGS. 7 to 9: In FIG. 7, controlling data 60 is stored within the PMA area 11 which indicates that the whole user data area 12 has been recorded although the whole user data area 12 is empty. FIG. 8 shows the case where controlling data 60' is stored within the PMA area 11 indicating that a part 61 of the user data area 12 is filled with user data although the user data area 12 is completely empty. FIG. 9 shows the case where controlling data 60" is stored within the PMA area 11 indicating that a part 62 of the user data area is filled with user data although the user data area 12 is completely empty.

Figure 10:
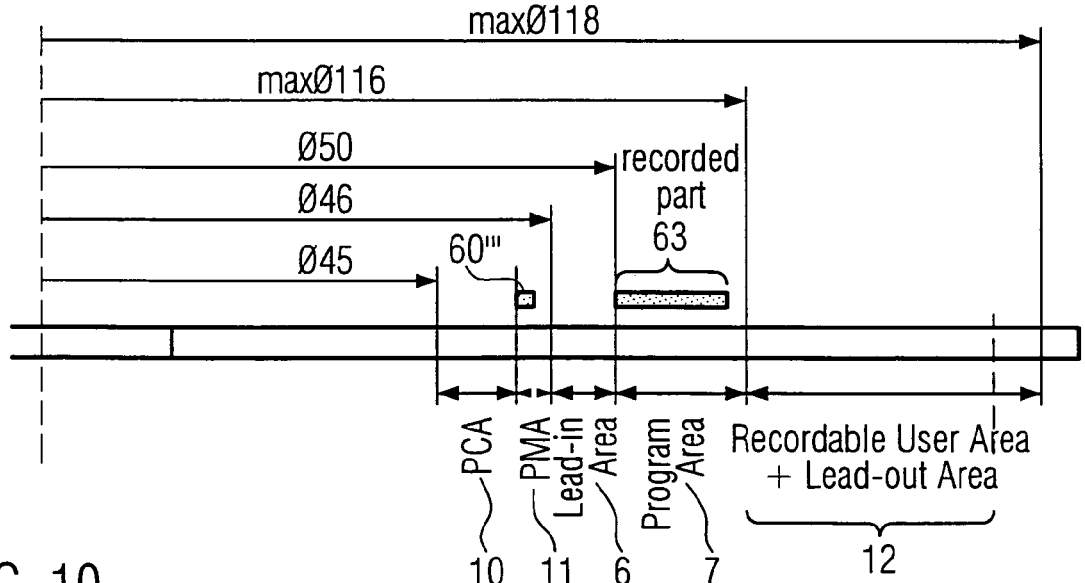
FIG. 10 shows a ninth embodiment of the recordable optical disc according to the present invention.

According to an embodiment of the present invention, the prestored controlling data comprises data which indicates to a standard optical disc recorder that a postgap of a track or a lead-out area within the user data areas has been recorded although the postgap/lead-out area are missing/are incomplete. An example of this embodiment is shown in FIG. 10: Controlling data 60''' is located within the PCA area 10/PMA area 11 which indicates that the complete program area 7 is recorded although only a part 63 of the program area 7 is recorded. For example, the last track within the program area 7 may be incomplete (for example the last minute or just the postgap of the last track may be missing).

Figure 11:
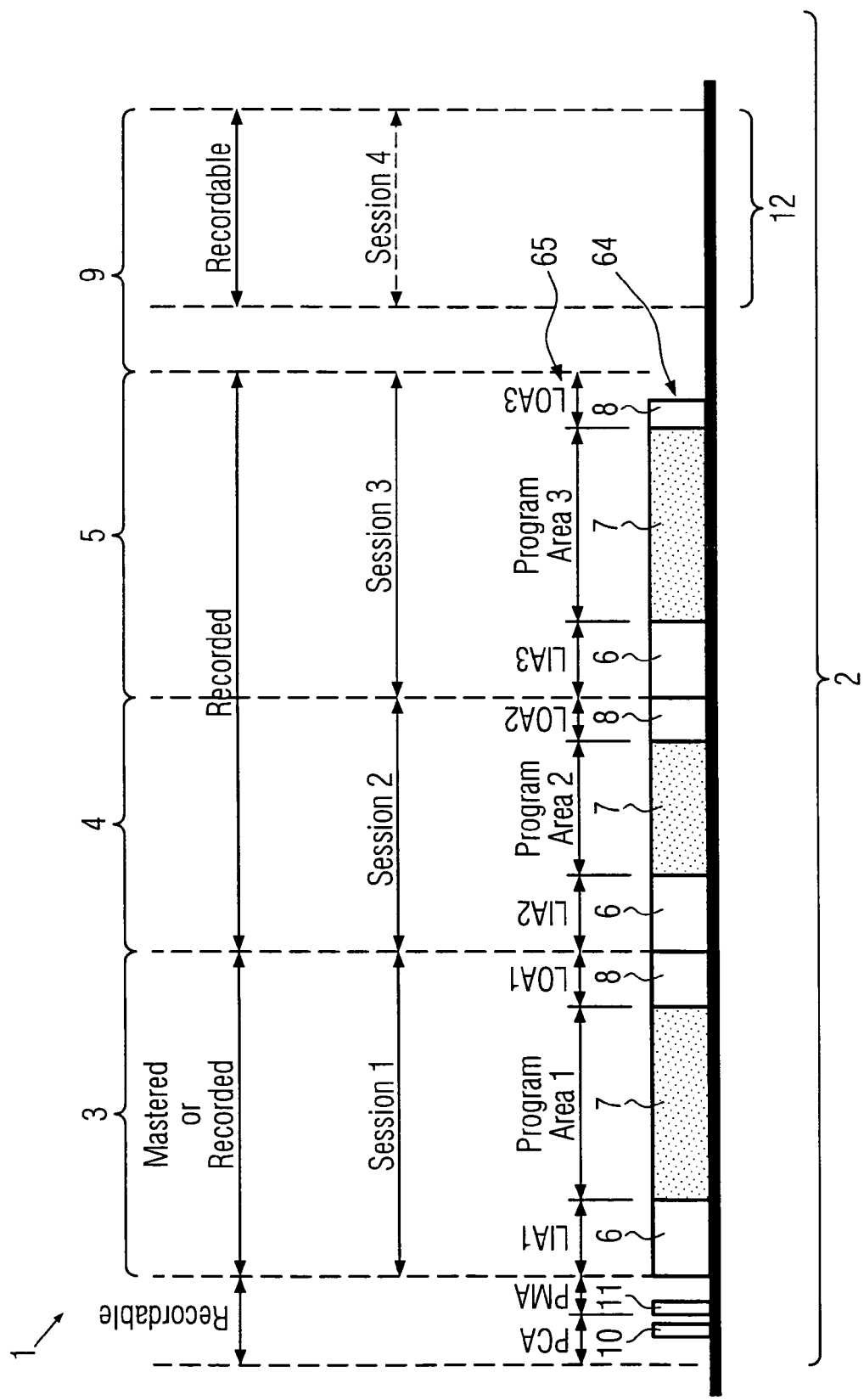
FIG. 11 shows a tenth embodiment of the recordable optical disc according to the present invention.

FIG. 11 shows the case where the length of the last lead-out area 64 recorded is shorter than the length of the lead-out area specified in the specification. Alternatively, the whole lead-out area 64 may be missing although the optical disc recorder expects that there is a lead-out since there is a lead-in area LIA3.

Figure 14:
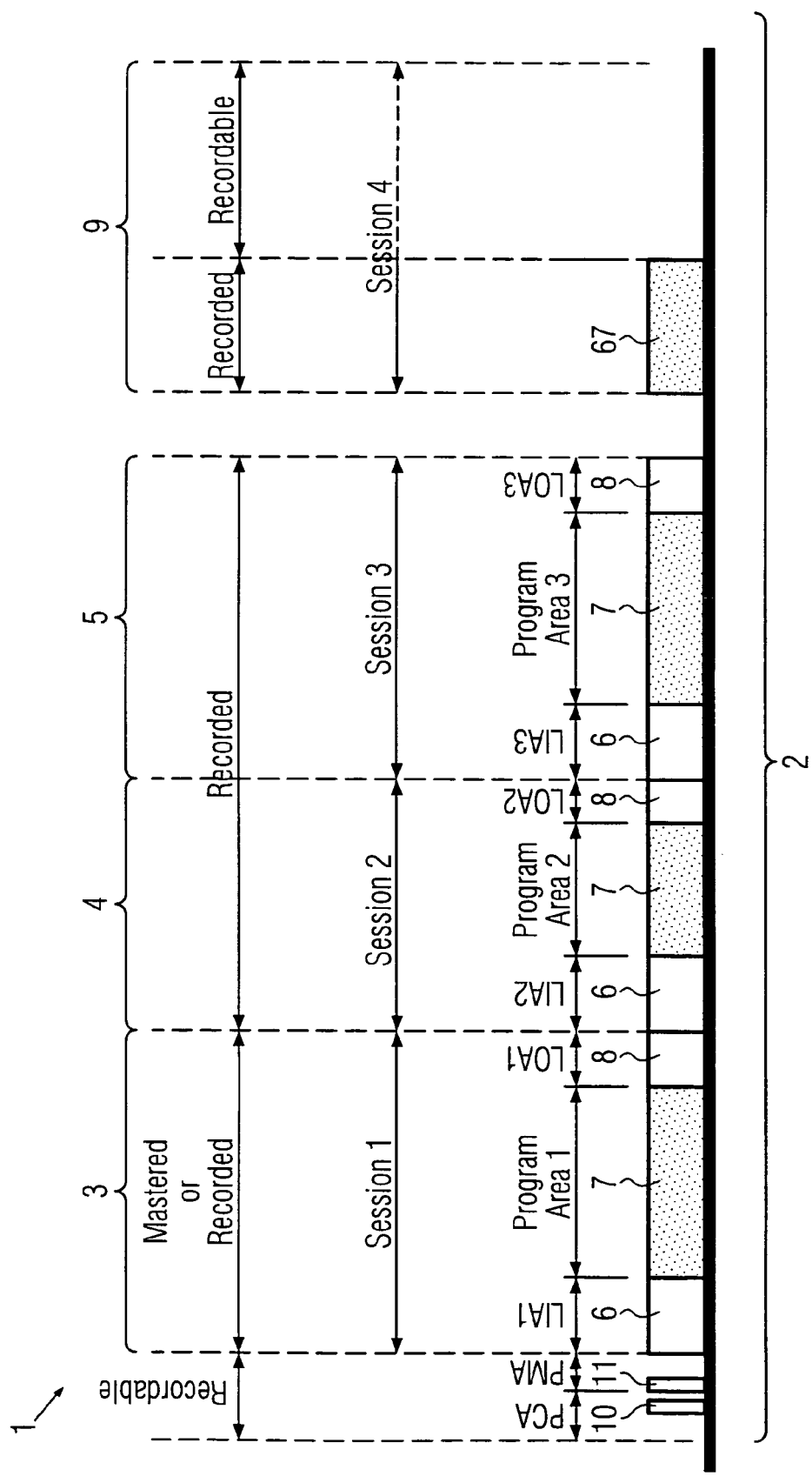
FIG. 14 shows a thirteenth embodiment of the recordable optical disc according to the present invention.

According to an embodiment of the present invention, the prestored controlling data comprises data which indicates to a standard optical disc recorder that all user data areas or at least a respective part thereof have not been filled with user data although said user data areas or parts thereof have been filled with user data. An example of this embodiment is shown in FIG. 13: Although there is no controlling data within the PMA area 11, a part 66 of the user data area 12 is recorded. The part 66 may for example be a pregap or a part of a pregap. Another example of this embodiment is shown in FIG. 14: Although there is no controlling data within the PMA area 11 indicating that a part 67 of a non-finalized fourth session 9 has been recorded, the part 67 of the fourth session has been recorded. The part 67 may consist of one or several tracks, wherein the last track may be complete or incomplete.

Figure 15:
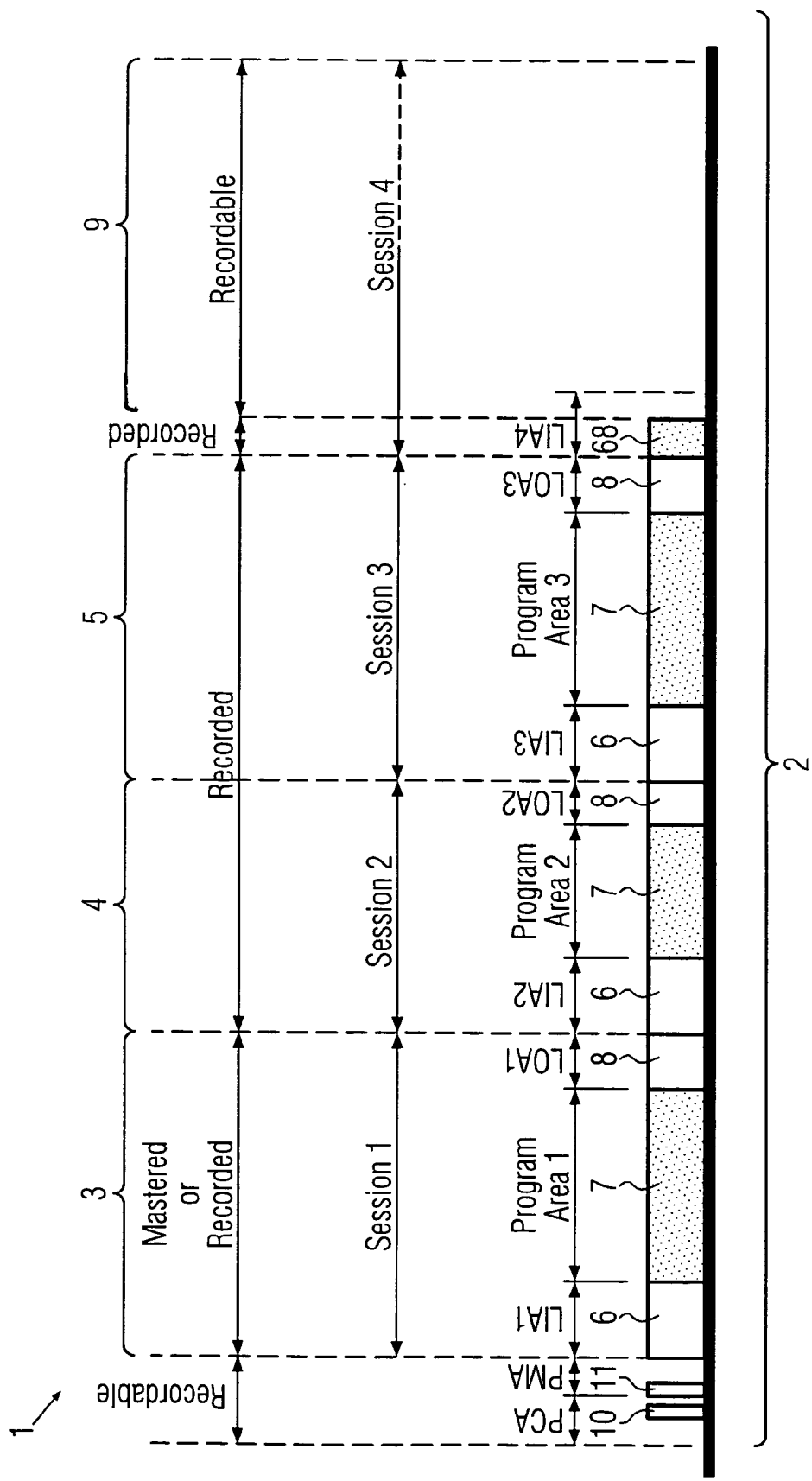
FIG. 15 shows a fourteenth embodiment of the recordable optical disc according to the present invention.

As already indicated above, according to an embodiment of the present invention, the prestored controlling data may comprise data which indicates to a standard optical disc recorder that no pregap and/or no complete/incomplete track and/or no lead-in area has been recorded within the user data area although a complete/incomplete pregap/track/lead-in area has been recorded. A further example of this embodiment is shown in FIG. 15: In this example an incomplete lead-in area 68 exists, although this area should be empty since there is no user data and no lead-out within Session 4.

According to an embodiment of the present invention, the prestored controlling data comprises data assigned to a specific data address range, wherein the data does not fulfill specification requirements associated with the specific data address to which the data is assigned. A possible realization of this embodiment is that the data is located within the extra information of the ATIP information of a compact disc or within prepit data block fields of a DVD-R or within physical format information of a DVD+R.

According to an embodiment of the present invention, the prestored controlling data comprises a disc application code which is not in conformity with the respective specification for the optical disc.

According to an embodiment of the present invention, the prestored controlling data comprises a disc type identification which is not in conformity with the respective specification for the optical disc.

According to an embodiment of the present invention, the prestored controlling data comprises a lead-in area starting timecode and/or data assigned to the lead-in area starting timecode which is not in conformity with the respective specification for the optical disc. At CD-R/RW the lead-in area starting timecode is associated with a Manufacturer ID.

In this embodiment the lead-in area starting timecode of a CD-R/RW is set to 00:00:00 or to a timecode within the PMA, PMA or user data area or to a timecode which is associated to a non-valid Manufacturer ID.

According to an embodiment of the present invention, the prestored controlling data comprises a lead-out area starting timecode and/or data assigned to the lead-out area starting timecode which is not in conformity with the respective specification for the optical disc. The lead-out area starting timecode represents a measure for the storage capacity of a CD-R/RW.

In this embodiment the lead-out area starting timecode of a CD-R/RW is set to a value within the PCA, PMA or lead-in area or a value which indicates a storage capacity which is smaller than the actual storage capacity of the CD-R/RW. For example the lead-out area starting timecode of a CD-R/RW is set to 00:04:00.

According to an embodiment of the present invention, the prestored controlling data comprises data located within the prepit data block fields of a DVD-R or within physical format information of a DVD+R.

Further, the following controlling data values may be set to wrong/misleading values: Indicative optimum writing power, reference speed, disc application code, disc type identification, disc sub-type, information about the presence of additional information, information provided in the additional information 1, additional information 2 and additional information 3, and the like, of a CD-R/CD-RW. In case of a DVD-R, the following controlling data values may be set to wrong/misleading values: Application code, disc physical code, last address of data recordable zone, OPC suggested code, wavelength code, write strategy code, manufacturer ID, and the like. In case of a DVD+R, the following controlling data values may be set to wrong/misleading values: Disc category and version number, disc size, disc structure, recording density, data zone allocation, disc application code, extended information indicators, disc manufacturer ID, media type ID, product revision number, number of physical format information bytes, basic write strategy, extended information block 0 to block 5, and the like.

It has to be mentioned that the present invention is also applicable to dual layer discs or multilayer discs. In this case, all embodiments described above and in the following can be applied to each of the layers of said discs.

FIG. 1 may also serve to illustrate two embodiments of the present invention: According to a first embodiment, the PMA area 11 comprises prestored data which indicates that the whole remaining part of the information area 2 which actually has not been filled up with user data so far (user data area 12) has already been filled up with user data. An optical disc recorder according to the present invention ignores the first data, thereby being capable of recording user data into the user data area 12. According to a second embodiment, it is assumed that the track data area 7 of the non-finalized fourth session 9 comprises a completed track 13 and a non-completed track 15 which is located immediately after the completed track 13. The non-completed track 15 is not recorded in conformity with the specification: The non-completed track 15 comprises a pregap area 14 only. Usually, the length of the pregap area 14 is two seconds:zero frames. The PMA area 11 usually comprises information about the track numbers and the corresponding start and stop times. In this embodiment, the PMA area 11 does only include information about the completed tracks, but not about the non-completed track 15. Therefore, a standard optical disc recorder gets confused when trying to record user data into the user data area 12 (i.e. when trying to record the track 15) since the standard optical disc recorder assumes that no user data has been recorded into the pregap area 14 although this area has already been recorded. The optical disc recorder according to the present invention, however, ignores the user data recorded into the pregap area 14, thereby being capable of recording user data into the user data area 12 and of completing the data track 15. After having completed the non-completed track 15, the optical disc recorder according to the present invention updates the data stored within the PMA area 11 such that the start time of the completed track is the same as the start time of the pregap area 14.

Alternatively, the length of the pregap area 14 may be lower than two seconds: zero frames, e.g. one second: zero frames (non completed pregap area 14). In this case, the optical disc recorder according to the present invention ignores the data within the non completed pregap area 14 and completes the pregap area 14, thereby being capable of recording user data into the user data area 12 and of completing the data track 15. After having completed the non-completed track 15, the optical disc recorder according to the present invention updates the data stored within the PMA area 11 such that the start time of the completed track is the same as the start time of the pregap area 14.

A DVD does not have a pregap area 14 in the data zone 24 which is comparable to the pregap area 14 in the user data area 12 of a compact disc. But in case of a DVD-R there is an "extra border zone" at the end of the lead-in zone (not shown) and in case of a DVD+R there is a "buffer zone 2" at the end of the lead-in zone (not shown) which could serve for a similar purpose.

A DVD comprises additional areas within the lead-in zone which could be recorded/and or mastered to serve for a similar purpose. For DVD-R these zones are e.g. the "initial zone", the "buffer zone 0", the "buffer zone 1" and the "extra border zone 1" (all not shown). For DVD+R these are e.g. the "guard zone", the "reserved zone 1", the "reserved zone 2", the "reserved zone 3", "buffer zone 1" and the "buffer zone 2" all not shown).

Figure 19:
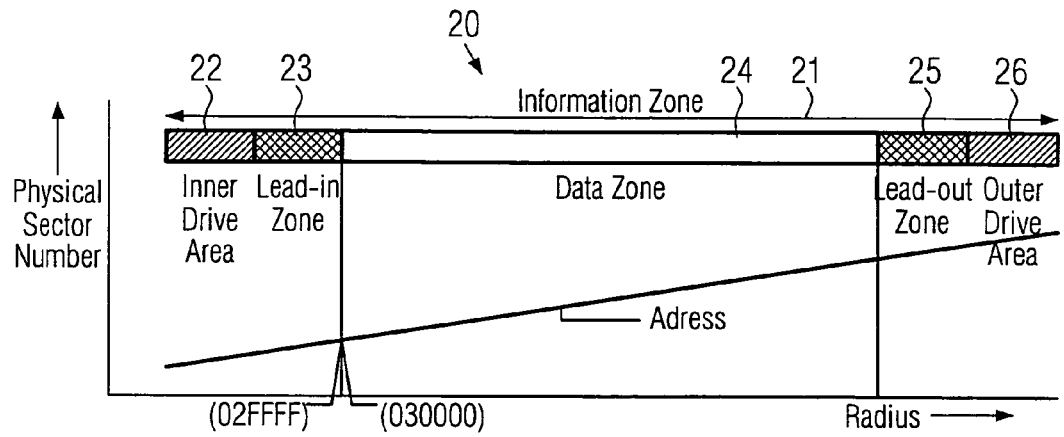
FIG. 19 depicts a seventeenth and eighteenth embodiment of the recordable optical disc according to the present invention.

All embodiments described above can be applied in a similar way to recordable DVDs. FIG. 19 shows for example further embodiments of the present invention in which a recordable DVD 20 is shown. The recordable DVD 20 shows an information zone 21 comprising an inner drive area 22, a lead-in zone 23, a data zone 24, a lead-out zone 25 and an outer drive area 26. The inner drive area 22 comprises a table of content zone (not shown) corresponding to a PMA area of a compact disc. In accordance with the first embodiment of the present invention (fifth embodiment), the prestored controlling data may concern data stored within the table of content zone indicating to a standard optical disc recorder that the data zone 24 has already been filled up with user data although this area has not been filled up with user data so far.

The inner drive area 22 further comprises a disc test zone (not shown), which corresponds to the test area 17 shown in FIG. 17. Further, the inner drive area comprises an inner disc count zone (not shown) corresponding to the count area 18 shown in FIG. 17. In accordance with an embodiment, both areas or a part thereof may be omitted. Alternatively, the inner disc count zone may be located at its standard position, and the inner disc test zone may be omitted.

Figure 20:
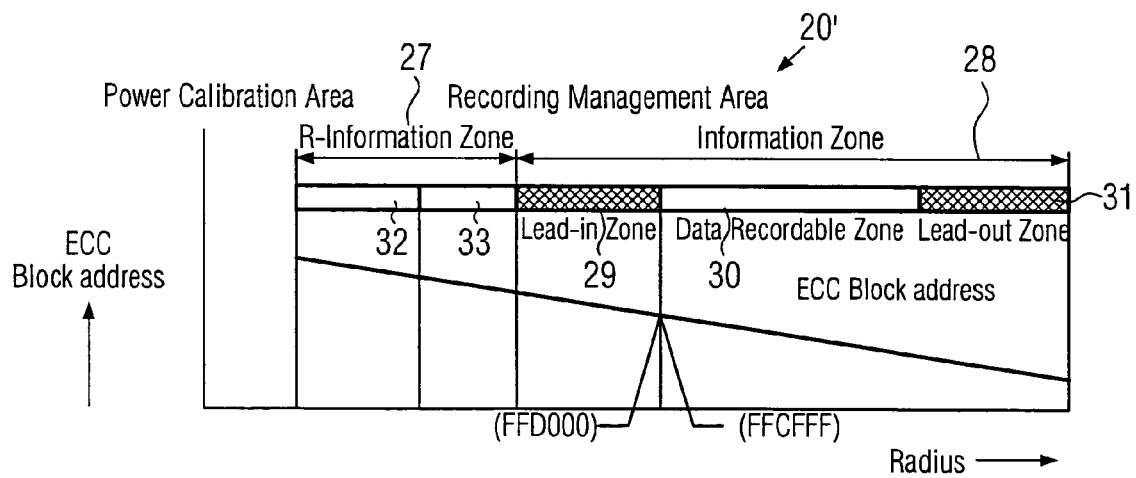
FIG. 20 shows a nineteenth embodiment of the recordable optical disc according to the present invention.

The recordable DVD 20 shown in FIG. 19 is a DVD+R. It is of course possible to apply the invention also to a DVD-R as shown in FIG. 20:

A recordable DVD 20' comprises an R-information zone 27, an information zone 28, the information zone 28 comprising a lead-in zone 29, a data recordable zone 30, and a lead-out zone 31. The R-information zone 27 comprises a power calibration area 32 and a recording management area 33.

Corresponding to the embodiment discussed above, the recording management area 33 may comprise controlling data indicating that the information zone 33 has already been filled up with user data, although this is not the case. Further, the power calibration area 32 may be omitted.

All embodiments discussed above in conjunction with timecode data of a CD can also be applied to address code data of a DVD in a similar way.

In the following description, further features of the present invention will be explained.

It has become apparent from the foregoing description that, according to the present invention, the logical structure of a disc is modified in such a way that a standard optical disc recorder cannot record or the recorded data is useless. Possible realizations of this basic principle are:

a) the empty disc seems to be fully or partially recorded;
b) a small part of the disc, e.g. the pregap—is mastered and/or recorded;
c) the optical disc recorder cannot perform the power calibration;
d) the optical disc recorder cannot find the starting position or consecutive position for recording.

In detail:

a) According to an embodiment of the present invention, the logical structure of a disc is modified in such a way that a standard optical disc recorder cannot record because the empty disc seems to be fully or partially recorded: On a recordable CD-R or CD-RW there is a so-called PMA-Program Memory Area where a temporary Table of Contents of the disc is stored. This area is accessible by optical disc recorders only. The present invention provides a disc where a PMA area is recorded which includes one track or multiple tracks occupying the whole disc or a part of the disc, however this track is not recorded or the multiple tracks are not recorded. A standard optical disc recorder will not record because it "sees" a full disc or a partially recorded disc. Only a modified optical disc recorder according to the present invention which does not care about this PMA data can record on such a disc. After recording of the track(s), the optical disc recorder according to the present invention may "overwrite" the PMA to make it unreadable so that the reading of the recorded disc by a standard optical disc recorder is not disturbed.

According to an embodiment of the present invention, the logical structure of a disc is modified in such a way that a standard optical disc recorder cannot record because it cannot find the starting position for recording which is located immediately after the mastered and/or recorded area. The present invention provides a disc which includes one track or multiple tracks in one session or multiple sessions occupying a part of the disc. Each of the sessions is finalized, i.e. comprises a lead-in area, a track data area which may comprise data tracks and/or audio tracks, respectively, and a lead-out area. The PMA area comprises information about the track numbers and the corresponding start and stop times of the mastered and/or recorded track(s). The lead-in area comprises information about the track numbers, corresponding start times of the mastered and/or recorded track(s), start time of lead-out and start address of the next program area on a multisession disc. According to the recordable compact disc specifications the lead-out length of the first session is 01:30:00 (or 6750 sectors). The length of the lead-out of the second or higher session(s) of a disc is 00:30:00 (or 2250 sectors). When a standard optical disc recorder attempts to add the next lead-in area it can read the information provided in the PMA area and in the preceding lead-in area(s) to be able to calculate the start time for recording of the lead-in area which is located immediately after the stop time of the last lead-out area and checks the stop time of the last lead-out area. The standard optical disc recorder according to the present invention, the lead-out length of the last session is shorter than specified by the recordable compact disc specifications. A standard optical disc recorder will not record because it cannot find the stop time of the last lead-out area. Only a modified optical disc recorder according to the present invention which does not care about the length of the lead-out area can record on such a disc. Additionally or optionally a modified optical disc recorder according to the present invention may complete the lead-out to its correct length.

This embodiment can be also applied to a DVD. For a DVD+R there is a similar area to the lead-out area called closure zone.

b) According to an embodiment of the present invention, the logical structure of a disc is modified in such a way that a standard optical disc recorder cannot record because a small part of the disc—e.g. the pregap—is mastered and/or recorded: On every recorded CD there is a so-called pregap in each track which precedes the track. The present invention provides a disc where the pregap is mastered and/or recorded in a mode defined by the customer. A standard optical disc recorder will not record because at the normal starting address it will find a mastered and/or recorded area. Only a modified optical disc recorder according to the present invention which can handle such a disc can append the track data after the mastered and/or recorded pregap.

c) According to an embodiment of the present invention, the logical structure of a disc is modified in such a way that a standard optical disc recorder cannot record because the standard optical disc recorder cannot perform the power calibration because it does not find the power calibration area or a part thereof: On a recordable CD-R or CD-RW there is a so-called PCA-Power Calibration Area where the standard optical disc recorder does some test recordings and then decides the laser power and writing strategy for the real recording. The PCA area is located before the PMA area, and on ultra speed discs there may be an additional PCA area at the outer circumference. This area is accessible by optical disc recorders only. The present invention provides a disc where the whole PCA area or a part thereof is omitted. A standard optical disc recorder will not record because it cannot perform the power calibration because the standard optical disc recorder expects at least the PCA area before the PMA area. Only a modified optical disc recorder according to the present invention which can perform the power calibration at another position (e.g. at the end of the PMA area, at the beginning of the lead-in area, within the user data area) can record onto the disc.

d) According to an embodiment of the present invention, the logical structure of a disc is modified in such a way that a standard optical disc recorder cannot record because the standard optical disc recorder cannot find the starting position for recording of the first track: On every recordable CD-R or CD-RW there is a timecode, the so-called ATIP. In the program area the ATIP starts at 00:00:00 (min-sec-frames) and increments constantly through the disc. During the lead-in area 1 out of 10 consecutive ATIP timecode data is replaced by extra information (special or additional information). During writing of the track data the timecode within the data stream is synchronized to the ATIP information. The present invention provides a disc including a timecode jump around the recording start time, e.g. ATIP 00:01:00 follows ATIP 99:59:74, so there is no 00:00:00 to 00:00:74 timecode. Only a modified optical disc recorder according to the present invention which can handle this timecode jump can record onto the disc.

Each physical position of the recordable compact disc is represented by ATIP timecode data. Normally, the ATIP timecode data is incremented continuously from the PCA area throughout the PMA area and the lead-in area starting at the start address of the PCA area—ending at ATIP timecode 99:59:74 and within the user data area starting at the ATIP timecode 00:00:00—ending at the end of the pregroove of the disc at the outer circumference of the disc.

According to an embodiment of the present invention, the ATIP timecode is not incremented continuously during the PCA area and/or PMA area and/or lead-in area and/or user data area but may show one or a combination of the following irregular ATIP timecode "behaviours":

the ATIP timecode is halted at a certain timecode the ATIP timecode is decrementing at a certain timecode the ATIP timecode features a positive timecode jump the ATIP timecode features a negative timecode jump the ATIP timecode is not present.

As a consequence, a standard optical disc recorder which expects an incrementing ATIP timecode according to the specification will refuse to record data into the PCA area and/or PMA area and/or lead-in area and/or user data area or will stop to record data into the PCA area and/or PMA area and/or lead-in area and/or user data area when such irregular ATIP timecode behaviors arise. In contrast, an optical disc recorder according to the present invention knows of the irregular ATIP timecode behaviors, thereby being capable of recording data into the PCA area and/or PMA area and/or lead-in area and into the user data area.

This embodiment can be also applied to address codes of a DVD.

Within the lead-in area of a compact disc extra information (special or additional information) is stored within the ATIP information such as write power, application code, disc type identification, start time of lead-in, last possible start time of lead-out and other information. This information is read-out by the recording software and/or compact disc recorder to identify the disc and to adjust certain parameters in order to be able to record to the disc. On ultra speed discs additional extra information may be stored in an additional extended ATIP area which is located before the PCA are.

According to an embodiment of the present invention, the extra information is modified to confuse the standard recording software and/or standard compact disc recorder. For example:

- the Disc Application Code is not valid
- the Disc Type Identification is not set correctly (in case of a CD-R or Hybrid CD-R it is set to indicate a CD-RW and in case of a CD-RW or Hybrid CD-RW it is set to indicate a CD-R)
- the start time of lead-in is not valid or wrong (e.g. set to ATIP timecode out of the normal range for the start time of lead-in start, or set ATIP timecode to 00:00:00 or to a timecode within the PMA, PMA or user data area)
- the start time of lead-out is not valid or wrong (e.g. set ATIP timecode out of the normal range for the start time of lead-out like values within the PMA, PMA or lead-in area or 00:00:00 or set small values e.g. 00:04:00)
- modify other parameters within this extra information which is suitable to confuse the standard recording software and/or standard compact disc recorder.

As a consequence, a standard optical disc recorder which expects extra information according to the specification or which 'sees' extra information which indicate that it makes no sense to record to the disc will refuse to record data into the lead-in area and/or user data area. In contrast, an optical disc recorder according to the present invention knows of this irregular extra information, thereby being capable of recording user data into the lead-in area and into the user data area.

For DVDs there is a similar system to provide extra information for the recording software and/or recorder. For DVD-R it is included in the information of the Pre-pit data block Fields 1 to 5 (see ECMA 359). For DVD+R it is included in the Physical Format Information in ADIP (see ECMA 349).

All embodiments discussed in conjunction with the second aspect of the present invention may be combined with the embodiments discussed in conjunction with the first aspect of the present invention in any way.

REFERENCE SYMBOLS 1, 1', 1" compact disc
2 information area
3 first session
4 second session
5 third session
6 lead-in area
7 track data area
8 lead-out area
9 fourth session
10 PCA area
11 PMA area
12 user data area
13 track
14 pregap area
15 track
16 XXA area (extended ATIP area)
17 test area
18 count area
18' timecode data
20, 20' DVD
21 information zone
22 inner drive area
23 lead-in zone
24 data zone
25 lead-out zone
26 outer drive area
27 R-information zone
28 information zone
29 lead-in zone
30 data recordable zone
31 lead-out zone
32 power calibration area
33 recording management area
40 data frame structure
$41_1$-$41_5$ data block
42 modified data frame structure
$43_1$-$43_4$ data block
50 ATIP timecode range
51 ATIP timecode range
52 ATIP timecode range
53 ATIP timecode range
54 ATIP timecode range
60, 60', 60", 60'" controlling data
61 part of user data area
62 part of user data area
63 part of the program area
64 lead-out area
65 lead-out area
66 part of user data area
67 part of session
68 lead-in area
100 physical structure
101 unrecorded part
102 recorded part
103 groove
104 land
105 groove pit
107 groove height
108 groove width (top)
109 groove width (bottom)
110 groove angle
111 recordable layer
112 recordable layer thickness on land
113 recordable layer thickness in groove
114 reflective layer
115 laser beam
116 recordable optical disc
117 groove spiral
118 missing or destroyed groove
119 additional laser beam
120 land prepit
121 wobbled shape
122 sine-waved form
123 saw-teeth form
124 phase modulation
125 comparing unit

The invention claimed is:

1. A recordable optical disc comprising:
   at least one user data area for storing user data; and
   at least one controlling data area for storing controlling data necessary for accessing stored user data and/or for recording user data into the user data areas,
   wherein at least a part of the physical structure of the optical disc corresponding to at least a part of at least one controlling data area and/or to at least a part of at least one user data area has a modified physical structure which is arranged such that a standard optical disc recorder cannot record user data into at least a part of at least one user data area and/or controlling data area.

2. The recordable optical disc according to claim 1, wherein the modified physical structure and/or modified optical/electrical signals which occur during the recording process and which result from the modified physical structure are not in conformity with the respective specification for the optical disc, such that the standard optical disc recorder has laser beam focusing problems and/or can not read address information/timecode information and/or can not set the right disc rotation speed, and/or that the laser beam of the standard optical disc recorder looses its track.

3. The recordable optical disc according to claim 2, wherein non conformity of the modified optical/electrical signals at least in part results from the width of a groove spiral, and/or the height of the groove spiral and/or a groove angle of the groove spiral.

4. The recordable optical disc according to claim 2 or 3, wherein the non conformity of the modified optical/electrical signals at least in part results from the relation between the thickness of a recordable layer within the groove spiral and the thickness of the recordable layer within other areas of the optical disc.

5. The recordable optical disc according to claim 2, wherein, within the modified physical structure, properties of a recordable layer are not in conformity with the respective specification for the optical disc.

6. The recordable optical disc according to claim 5,
wherein the recordable layer used within a groove spiral requires a writing laser beam wavelength and/or writing laser beam strength and/or a writing strategy which is not in conformity with the respective specification for the optical disc, and
requires a reading laser beam wavelength and/or reading laser beam strength which is in conformity with the respective specification for the optical disc.

7. The recordable optical disc according to claim 2, wherein, within the modified physical structure, a part of a groove spiral is missing and/or destroyed.

8. The recordable optical disc according to claim 7, wherein the missing and/or destroyed part of the groove spiral is located within portions of the optical disc which are not read out by a standard optical disc reader after recording.

9. The recordable optical disc according to claim 7, wherein the length of the missing and/or destroyed part of the groove spiral is longer than a maximum tolerable defect diameter according to the respective specification for the optical disc, thereby causing an optical disc recorder to loose its track.

10. The recordable optical disc according to claim 7, wherein the length of the missing and/or destroyed part of the groove spiral is longer than a maximum correctable defect length of the optical disc, thereby causing an optical disc recorder to loose its track.

11. The recordable optical disc according to claim 2, wherein, within the modified physical structure, the shape of at least a part of a groove spiral deviates from optimum shape with an effect that a writing laser beam is not centered over a track and/or the electrical signals into which the optical signals are converted are not within the respective specification for the optical disc, thereby causing an optical disc recorder to deviate from the center of the track and/or loose its track.

12. The recordable optical disc according to claim 11, wherein the deviation from the optimum shape of the groove spiral is located within parts of the optical disc which are not read out by a standard optical disc reader after recording.

13. The recordable optical disc according to claim 11, wherein a residual tracking error caused by deviation from the optimum shape of the groove spiral is above the residual tracking error limit according to the respective specification for the optical disc, thereby causing an optical disc recorder to loose the track.

14. The recordable optical disc according to claim 2, wherein at least a part of the modified physical structure relates to a physical structure from which physical location information along a groove spiral is derived.

15. The recordable optical disc according to claim 14, wherein at least a part of the modified physical structure relates to a physical structure from which ATIP timecode information or ADIP/LPP address code information is derived.

16. The recordable optical disc according to claim 14, wherein, within the modified physical structure, at least a part of the groove spiral does not show a wobbled shape.

17. The recordable optical disc according to claim 14, wherein, within the modified physical structure, at least a part of the groove spiral shows a wobbled shape, the wobbling parameters which characterize the wobbled shape however not being in conformity with the respective specification for the optical disc.

18. The recordable optical disc according to claim 17, wherein the wobbled shape and/or a wobbling frequency and/or a wobbling amplitude are not in conformity with the respective specification for the optical disc.

19. The recordable optical disc according to claim 17, wherein a wobbling frequency is higher than a maximum frequency of a radial tracking servo according to the respective specification for the optical disc.

20. The recordable optical disc according to claim 17, wherein, within at least a part of the modified physical structure, no ATIP timecode information or ADIP/LPIP address code information is included within the wobbled shape and/or a wobbling frequency and/or a wobbling amplitude of the groove spiral.

21. The recordable optical disc according to claim 14, wherein the ATIP timecode information or ADIP/LPIP address code information is not included within a wobbled shape and/or a wobbling frequency and/or a wobbling amplitude of the groove spiral, but is included within additional physical structure elements which are not in conformity with the respective specification for the optical disc.

22. The recordable optical disc according to claim 21, wherein the additional physical structure elements are prepits located within the groove spiral.

23. The recordable optical disc according to claim 21, wherein the additional physical structure elements are located within/near to the groove spiral and show a phase modulated sine-wave form along the groove spiral.

24. The recordable optical disc according to claim 21, wherein the additional physical structure elements are located within/near to the groove spiral and show a frequency modulated sine-wave from along the groove spiral.

25. The recordable optical disc according to claim 21, wherein the additional physical structure elements are located within/near to the groove spiral and show a saw-teeth-modulated sine-wave form along the groove spiral.

26. A master disc for storing a master image, said master disc being suitable to transfer said master image onto a plurality of recordable optical discs, wherein
said master image represents at least one user data area for storing user data, and at least one controlling data area for storing controlling data necessary for accessing stored user data and/or for recording user data into the user data areas of a recordable optical disc,
wherein at least a part of the master image which corresponds to at least a part of at least one controlling data area and/or to at least a part of at least one user data area represents a modified physical structure of the recordable optical disc which is arranged such that a standard optical disc recorder cannot record user data into at least a part of at least one user data area and/or controlling data area.

27. A optical disc recorder for recording data onto a recordable optical disc which comprises at least one user data area for storing user data, and at least one controlling data area for storing controlling data necessary for accessing stored user data and/or for recording user data into the user data areas of a recordable optical disc, wherein at least a part of the physical structure of the optical disc which corresponds to at least a part of at least one controlling data area and/or to at least a part of at least one user data area has a modified physical structure which is arranged such that a standard optical disc recorder cannot record user data into at least a part of at least one user data area and/or controlling data area, wherein the optical disc recorder possesses information about the modified physical structure and/or is built or modified to cope with the modified physical structure, thereby enabling the optical disc recorder to record user data into said part of at least one user data area and/or controlling data area.

* * * * *